US012606920B2

(12) United States Patent
Krause et al.

(10) Patent No.: US 12,606,920 B2
(45) Date of Patent: Apr. 21, 2026

(54) PRODUCTION OF GAS DIFFUSION ELECTRODES COMPRISING ION TRANSPORT RESINS FOR ELECTROCHEMICAL REDUCTION OF CO$_2$

(71) Applicant: Siemens Energy Global GmbH & Co. KG, Munich (DE)

(72) Inventors: Ralf Krause, Herzogenaurach (DE); Christian Reller, Minden (DE); Günter Schmid, Hemhofen (DE); Bernhard Schmid, Erlangen (DE); Frank Steinbacher, Eckental (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 706 days.

(21) Appl. No.: 16/493,230

(22) PCT Filed: Feb. 15, 2018

(86) PCT No.: PCT/EP2018/053768
§ 371 (c)(1),
(2) Date: Sep. 11, 2019

(87) PCT Pub. No.: WO2018/166739
PCT Pub. Date: Sep. 20, 2018

(65) Prior Publication Data
US 2020/0131649 A1      Apr. 30, 2020

(30) Foreign Application Priority Data
Mar. 13, 2017      (DE) ..................... 10 2017 204 096.3

(51) Int. Cl.
*C25B 11/031*          (2021.01)
*B01D 53/32*          (2006.01)
(Continued)

(52) U.S. Cl.
CPC .......... *C25B 11/031* (2021.01); *B01D 53/326* (2013.01); *C01B 3/50* (2013.01);
(Continued)

(58) Field of Classification Search
CPC ....... C25B 11/02–11/032; H01M 4/06; H01M 4/8605–4/8626; H01M 2004/021
See application file for complete search history.

(56) References Cited

U.S. PATENT DOCUMENTS

| | | | |
|---|---|---|---|
| 4,603,118 A | 7/1986 | Staab | 502/101 |
| 4,892,637 A | 1/1990 | Sauer et al. | 204/291 |

(Continued)

FOREIGN PATENT DOCUMENTS

| | | | |
|---|---|---|---|
| AU | 2018/233505 A1 | 7/2019 | C25B 1/00 |
| CA | 103741164 B | 4/2014 | C25B 11/03 |

(Continued)

OTHER PUBLICATIONS

Lorric ("Polysulfone(PSU) material datasheet", 2016) (Year: 2016).*
(Continued)

*Primary Examiner* — Alexander W Keeling
(74) *Attorney, Agent, or Firm* — Slayden Grubert Beard PLLC

(57) ABSTRACT

Various embodiments include a gas diffusion electrode comprising: a metal M selected from the group consisting of: Ag, Au, Cu, and Pd; a binder; hydrophilic and hydrophobic pores and/or channels; and an anion transport material in the pores and/or channels.

8 Claims, 14 Drawing Sheets

(51) Int. Cl.

| | |
|---|---|
| *C01B 3/50* | (2026.01) |
| *C25B 1/23* | (2021.01) |
| *C25B 3/25* | (2021.01) |
| *C25B 9/00* | (2021.01) |
| *C25B 9/19* | (2021.01) |
| *C25B 9/23* | (2021.01) |
| *C25B 11/032* | (2021.01) |
| *C25B 11/042* | (2021.01) |
| *C25B 11/053* | (2021.01) |
| *C25B 11/095* | (2021.01) |

(52) U.S. Cl.

CPC .................. *C25B 1/23* (2021.01); *C25B 3/25* (2021.01); *C25B 9/00* (2013.01); *C25B 9/19* (2021.01); *C25B 9/23* (2021.01); *C25B 11/032* (2021.01); *C25B 11/042* (2021.01); *C25B 11/053* (2021.01); *C25B 11/095* (2021.01)

(56) References Cited

U.S. PATENT DOCUMENTS

| | | | | |
|---|---|---|---|---|
| 6,465,136 | B1 * | 10/2002 | Fenton ................ | H01M 8/1051 |
| | | | | 429/304 |
| 7,704,369 | B2 | 4/2010 | Olah et al. ..................... | 205/450 |
| 9,481,939 | B2 | 11/2016 | Masel et al. | |
| 2004/0157101 | A1 * | 8/2004 | Smedley ................. | H01M 4/06 |
| | | | | 429/492 |
| 2004/0182695 | A1 | 9/2004 | Bulan et al. ................... | 204/284 |
| 2005/0106450 | A1 * | 5/2005 | Castro ................... | H01M 4/926 |
| | | | | 429/534 |
| 2006/0249380 | A1 | 11/2006 | Gestermann et al. ........ | 204/296 |
| 2006/0263232 | A1 | 11/2006 | Bulan ................................ | 419/9 |
| 2011/0027666 | A1 * | 2/2011 | Burchardt ........... | H01M 4/8663 |
| | | | | 429/405 |
| 2011/0311903 | A1 | 12/2011 | Bulan et al. ................... | 429/524 |
| 2012/0021302 | A1 | 1/2012 | Bulan et al. ................... | 429/405 |
| 2012/0100442 | A1 | 4/2012 | Bulan et al. ................... | 429/405 |
| 2012/0100461 | A1 * | 4/2012 | Iden .................... | H01M 4/8605 |
| | | | | 429/516 |
| 2012/0171583 | A1 | 7/2012 | Bocarsly et al. ............. | 429/413 |
| 2013/0228470 | A1 | 9/2013 | Chen ............................. | 205/462 |
| 2013/0256151 | A1 | 10/2013 | Woltering et al. ........... | 205/618 |
| 2014/0251822 | A1 | 9/2014 | Bhavaraju et al. .......... | 205/441 |
| 2016/0160366 | A1 | 6/2016 | Polcyn et al. ................ | 205/335 |
| 2016/0251766 | A1 | 9/2016 | Masel et al. .................. | 204/252 |
| 2016/0272514 | A1 * | 9/2016 | Sumita .................. | C02F 1/4618 |
| 2017/0012334 | A1 * | 1/2017 | Yamamura ............ | H01M 12/08 |
| 2017/0037522 | A1 * | 2/2017 | Kaczur ..................... | C25B 9/19 |
| 2018/0230612 | A1 | 8/2018 | Krause et al. | |

FOREIGN PATENT DOCUMENTS

| | | | | |
|---|---|---|---|---|
| CN | 104428449 A | 3/2015 | ............. | C25B 11/04 |
| CN | 105316702 A | 2/2016 | ............. | C25B 11/12 |
| DE | 37 10 168 A1 | 10/1988 | ............. | B01J 31/06 |
| DE | 101 48 599 A1 | 4/2003 | ............. | C25B 11/02 |
| DE | 103 35 184 A1 | 3/2005 | ............. | C25B 13/00 |
| DE | 10 2005 023 615 A1 | 11/2006 | ............. | C25B 11/00 |
| DE | 10 2010 054 643 A1 | 6/2012 | .............. | C25B 9/10 |
| DE | 10 2013 011 298 A1 | 2/2015 | .............. | C25B 1/34 |
| DE | 10 2015 203 245 A1 | 8/2016 | ............. | C25B 11/06 |
| DE | 10 2015 215 309 A1 | 2/2017 | ............. | C25B 11/04 |
| EP | 0 297 377 A2 | 1/1989 | ............. | B01J 23/34 |
| EP | 0 115 845 B1 | 3/1990 | .............. | B01J 23/50 |
| EP | 1 685 892 A1 | 8/2006 | ............. | B01D 67/00 |
| EP | 2 398 101 A1 | 12/2011 | ............. | C25B 11/03 |
| EP | 2 410 079 A2 | 1/2012 | ............. | C25B 11/03 |
| EP | 2 444 526 A2 | 4/2012 | ............. | C25B 11/03 |
| JP | 0693485 A | 4/1994 | ............. | C07C 53/02 |

| | | | | |
|---|---|---|---|---|
| WO | WO-9945606 A1 * | 9/1999 | ......... | H01M 4/8605 |
| WO | WO-2010018370 A1 * | 2/2010 | ............ | C08J 5/2231 |
| WO | 2018/166739 A1 | 9/2018 | .............. | C25B 1/00 |

OTHER PUBLICATIONS

Goh et al.("5.3.1 Ion-Exchange Membranes", Membrane-Based Salinity Gradient Processes for Water Treatment and Power Generation, 2018, pp. 155-174) (Year: 2018).*

Kneller, Eckart et al. "The Alloy System Copper-Zirconium, Part I. Phase Diagram and Structural Relations," Journal of Metallurgy, Apr. 1, 1986, vol. 77, pp. 43-48.

Dewulf, David W. et al., "The Electrochemical Reduction of C02 to CH4 and C2H4 at Cu/Nafion Electrodes (solid polymer electrolyte structures)," Catalysis Letters 1, Jan. 1988, vol. 1, Issue 1-3, pp. 73-79.

Subramanian, P.R. et al., "The Cu—Hf (Copper-Hafnium)System," Bulletin of Alloy Phase Diagrams, Feb. 1988, vol. 9, No. 1, pp. 51-56, excerpts pp. 51-52.

Cook, Ronald L. et al., "High Rate Gas Phase CO2 Reduction to Ethylene and Methane Using Gas Diffusion Electrodes," The Electrochemical Society, Inc., Journal of the Electrochemical Society, vol. 137, No. 2, Feb. 1990, pp. 607-608.

Landolt-Börnstein, Group IV Physical Chemistry, vol. 5d, 1994, pp. 1-8 (English Abstract Comment & Summary).

Braunovic, Milenko et al., "Electrical Contacts, Fundamentals, Applications and Technology," CRC Press 2007, 2 pages (English Abstract Comment & Summary).

Hori, Y., "Electrochemical CO2 Reduction on Metal Electrodes," Springer Science+Business Media, LLC 2008, Modern Aspects of Electrochemistry, No. 42, pp. 89-189.

Zhang, Fengxiang et al., "PTFE based composite anion exchange membranes: thermally induced in situ polymerization and direct hydrazine hydrate fuel cell application," The Royal Society of Chemistry Aug. 18, 2010, Journal of Material Chemistry, vol. 20, Issue 37, pp. 8139-8146.

Rahman, S.U. et al., "Effect of solid polymer electrolyte on electrochemical reduction of CO2," Elsevier B.V., Separation and Purification Technology, vol. 94, Jun. 19, 2012, pp. 131-137.

Prakash, Surya G.K. et al, "Electrochemical reduction of CO2 over Sn-Nafion® coated electrode for a fuel-cell-like device," Elsevier B.V., Journal of Power Sources, vol. 223, Feb. 2013, pp. 68-73.

Shironita, Sayoko et al., "Feasibility investigation of methanol generation by CO2 reduction using Pt/C-based membrane electrode assembly for a reversible fuel cell," Elsevier B.V., Journal of Power Sources, vol. 228, Apr. 15, 2013, pp. 68-74.

Aeshala, L.M., et al., "Effect of cationic and anionic solid polymer electrolyte on direct electrochemical reduction of gaseous CO2 to fuel," Elsevier Ltd., Journal of CO2 Utilization, vol. 3-4, Dec. 2013, pp. 49-55.

Petzoldt, F. et al., "Einfluss intermetallischer Phasen auf die Langzeitstabilität von ultraschallgeschweißten Kupfer-Aluminium-Kontakten," Metall-Forschung, Nov. 2013, 67. Jahrgang, pp. 504-507 (German language w/English translation).

Uppaluri, Ramagopal et al., "Electrochemical conversion of CO2 to fuels: tuning of the reaction zone using suitable functional groups in a solid polymer electrolyte," Royal Society of Chemistry, Physical Chemistry Chemical Physics, Issue 33, Jun. 9, 2014, pp. 17588-17594.

German Office Action, Application No. 10 2017 204 096.3, 10 pages, Nov. 3, 2017.

International Search Report and Written Opinion, Application No. PCT/EP2018/053768, 22 pages, Jun. 13, 2018.

Search Report for International Application No. PCT/EP2018/053768, 13 pages, Jun. 13, 2018.

Chinese Office Action, Application No. 201880017195.7, 7 pages, Jan. 5, 2021.

* cited by examiner

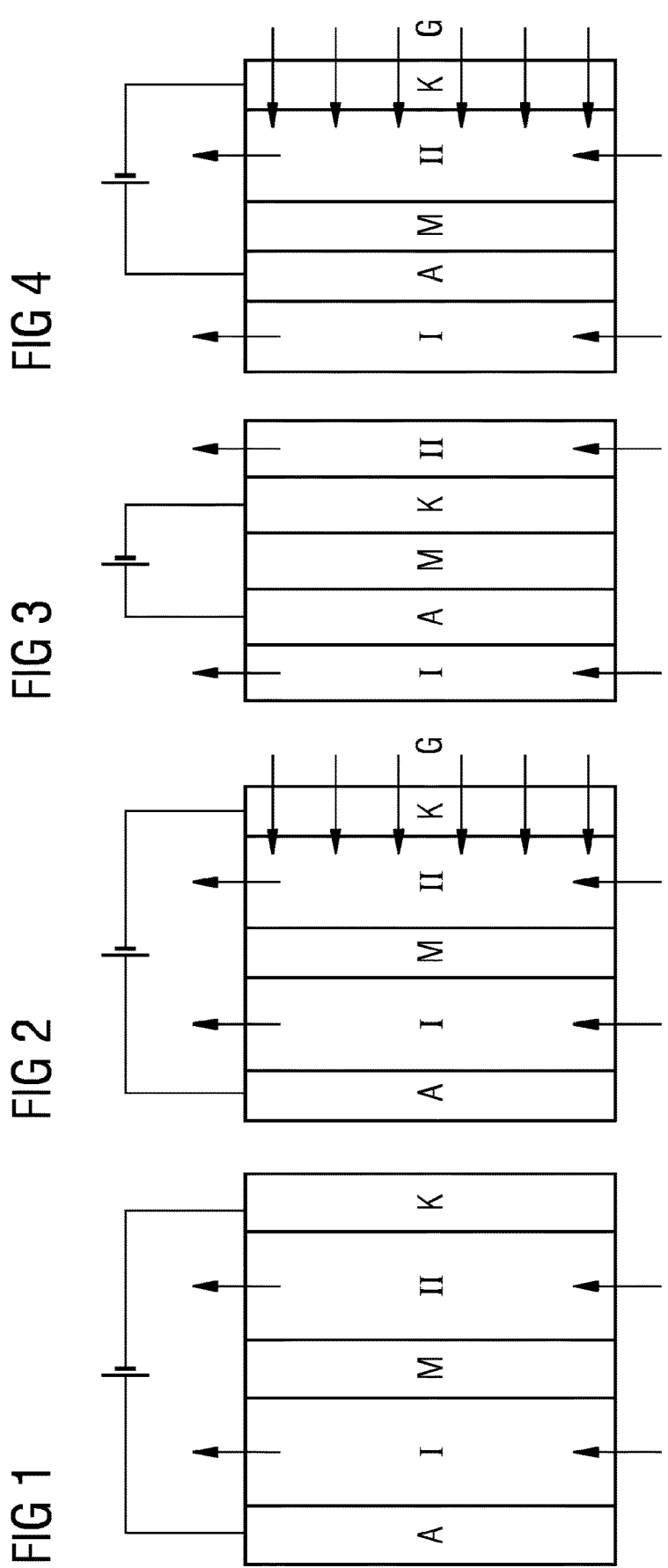

46

47

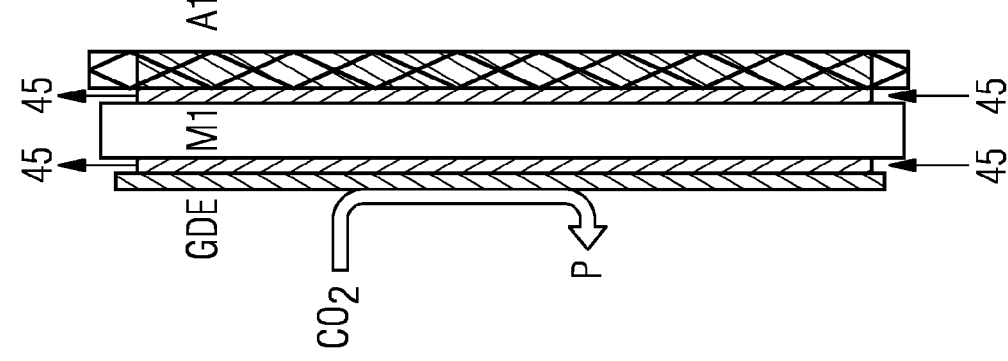
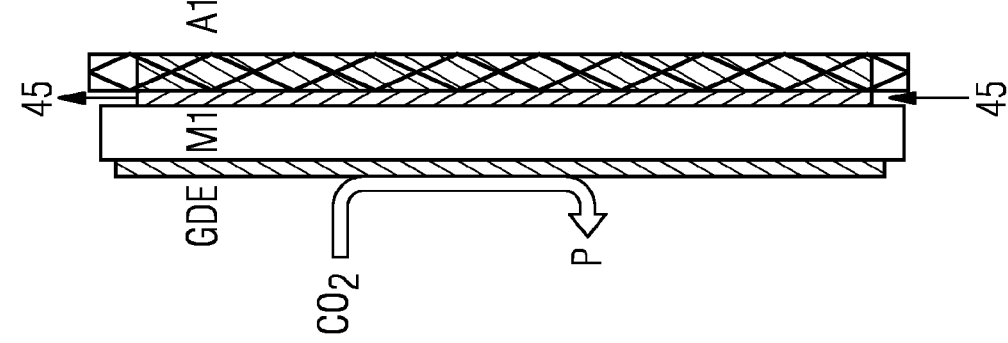

$\oplus = 51$
$\ominus = 52$ $2e^- + H_2O + 1/2\ O_2 \rightarrow 2\ OH^-$ $\oplus = 51$
$\ominus = 52$ $+ CO_2 \rightleftharpoons HCO_3^-$ $2e^- + H_2O + 1/2\ O_2 \rightarrow 2\ OH^-$ FIG 28
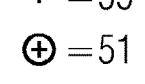
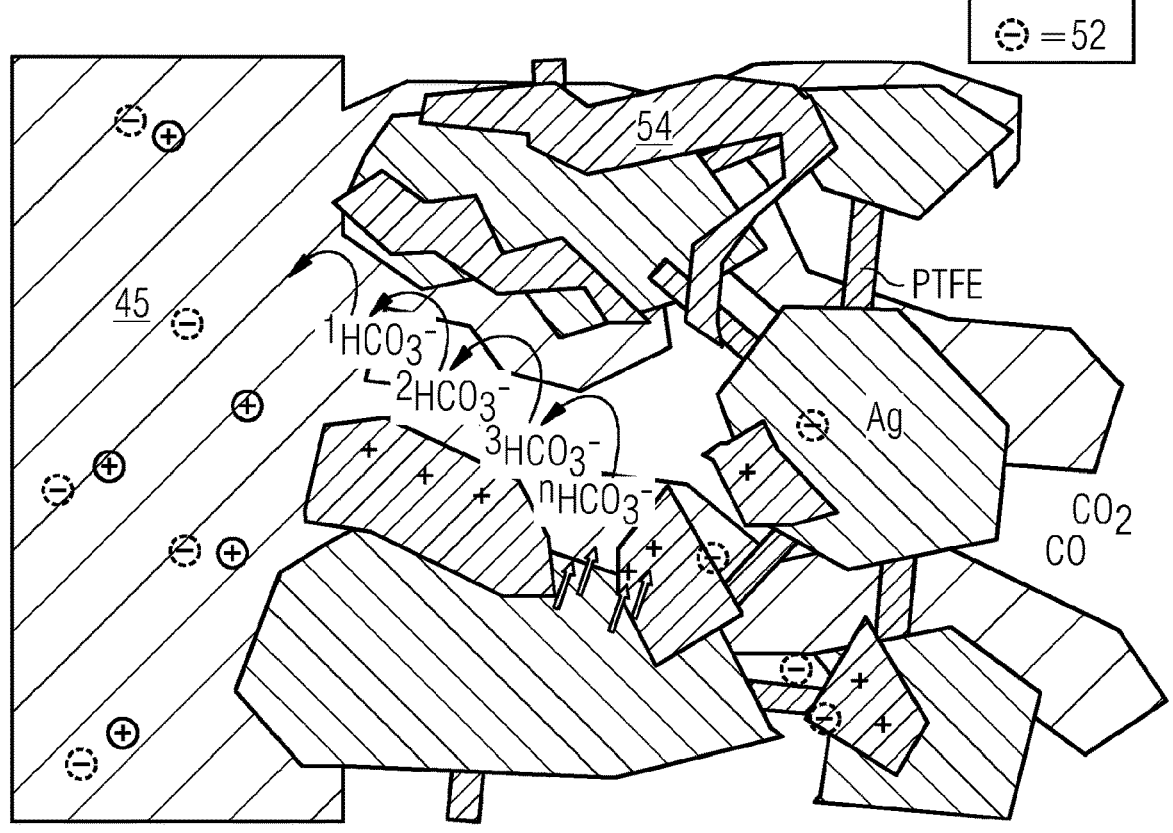
FIG 29
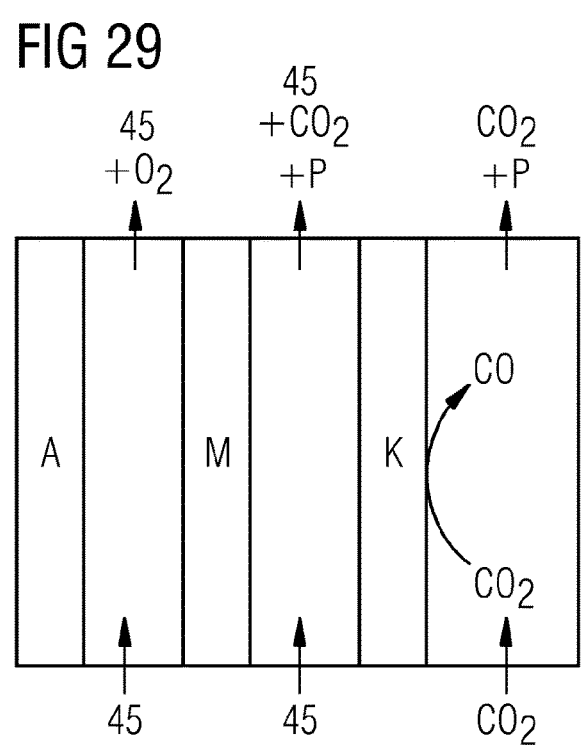

PRODUCTION OF GAS DIFFUSION ELECTRODES COMPRISING ION TRANSPORT RESINS FOR ELECTROCHEMICAL REDUCTION OF CO$_2$

CROSS-REFERENCE TO RELATED APPLICATIONS

This application is a U.S. National Stage Application of International Application No. PCT/EP2018/053768 filed Feb. 15, 2018, which designates the United States of America, and claims priority to DE Application No. 10 2017 204 096.3 filed Mar. 13, 2017, the contents of which are hereby incorporated by reference in their entirety.

TECHNICAL FIELD

The present disclosure relates to electrochemical reduction. Various embodiments may include gas diffusion electrodes, processes for production thereof, use thereof in the reduction of CO$_2$ and/or CO, and/or electrolysis cells and electrolysis systems.

BACKGROUND

Nowadays about 80% of the global energy demand is covered by the combustion of fossil fuels, the combustion processes of which cause global emission of about 34 000 million metric tons of carbon dioxide per year into the atmosphere. This release into the atmosphere disposes of the majority of carbon dioxide, which, for example, in the case of a brown coal power plant, can amount to up to 50 000 metric tons per day. Carbon dioxide is A greenhouse gas, the adverse effects of which on the atmosphere and the climate are a matter of some dispute. It is an industrial challenge to produce products of value from CO$_2$. Since carbon dioxide is at a very low thermodynamic level, it can be reduced to reusable products only with difficulty, which has left the actual reutilization of carbon dioxide in the realm of theory or in the academic field to date.

Natural carbon dioxide degradation proceeds, for example, via photosynthesis. This involves conversion of carbon dioxide to carbohydrates in a process subdivided into many component steps over time and, at the molecular level, in terms of space. As such, this process cannot easily be adapted to the industrial scale. No replication of the natural photosynthesis process with photocatalysis on an industrial scale to date has been efficient enough to employ.

A further method is the electrochemical reduction of carbon dioxide. Systematic studies of the electrochemical reduction of carbon dioxide are a relatively new field of development. In the last few years, there has been a significant rise in research activities because the availability of electrical surplus energy from nonfossil production sources such as solar or wind has made the storage/utilization of this energy appear viable from an economic point of view.

Only in the last few years have there been efforts to develop an electrochemical system that can reduce an acceptable amount of carbon dioxide. Studies on laboratory scale have shown that metals should be used as catalysts for electrolysis of carbon dioxide. For electrolysis of CO$_2$, consequently, metals are generally used as catalysts, some of which are shown by way of example in table 1, taken from Y. Hori, Electrochemical CO$_2$ reduction on metal electrodes, in: C. Vayenas, et al. (eds.), Modern Aspects of Electrochemistry, Springer, New York, 2008, pp. 89-189.

TABLE 1

| Faraday efficiencies for the conversion of CO$_2$ to various products at various metal electrodes | | | | | | | |
|---|---|---|---|---|---|---|---|
| Electrode | CH$_4$ | C$_2$H$_4$ | C$_2$H$_5$OH | C$_3$H$_7$OH | CO | HCOO- | H$_2$ | Total |
| Cu | 33.3 | 25.5 | 5.7 | 3.0 | 1.3 | 9.4 | 20.5 | 103.5 |
| Au | 0.0 | 0.0 | 0.0 | 0.0 | 87.1 | 0.7 | 10.2 | 98.0 |
| Ag | 0.0 | 0.0 | 0.0 | 0.0 | 81.5 | 0.8 | 12.4 | 94.6 |
| Zn | 0.0 | 0.0 | 0.0 | 0.0 | 79.4 | 6.1 | 9.9 | 95.4 |
| Pd | 2.9 | 0.0 | 0.0 | 0.0 | 28.3 | 2.8 | 26.2 | 60.2 |
| Ga | 0.0 | 0.0 | 0.0 | 0.0 | 23.2 | 0.0 | 79.0 | 102.0 |
| Pb | 0.0 | 0.0 | 0.0 | 0.0 | 0.0 | 97.4 | 5.0 | 102.4 |
| Hg | 0.0 | 0.0 | 0.0 | 0.0 | 0.0 | 99.5 | 0.0 | 99.5 |
| In | 0.0 | 0.0 | 0.0 | 0.0 | 2.1 | 94.9 | 3.3 | 100.3 |
| Sn | 0.0 | 0.0 | 0.0 | 0.0 | 7.1 | 88.4 | 4.6 | 100.1 |
| Cd | 1.3 | 0.0 | 0.0 | 0.0 | 13.9 | 78.4 | 9.4 | 103.0 |
| Tl | 0.0 | 0.0 | 0.0 | 0.0 | 0.0 | 95.1 | 6.2 | 101.3 |
| Ni | 1.8 | 0.1 | 0.0 | 0.0 | 0.0 | 1.4 | 88.9 | 92.4 |
| Fe | 0.0 | 0.0 | 0.0 | 0.0 | 0.0 | 0.0 | 94.8 | 94.8 |
| Pt | 0.0 | 0.0 | 0.0 | 0.0 | 0.0 | 0.1 | 95.7 | 95.8 |
| Ti | 0.0 | 0.0 | 0.0 | 0.0 | 0.0 | 0.0 | 99.7 | 99.7 |

Table 1 shows Faraday efficiencies (FE) in [%] of products formed in carbon dioxide reduction at various metal electrodes. The values reported are applicable to a 0.1 M potassium hydrogencarbonate solution as electrolyte.

While carbon dioxide is reduced virtually exclusively to carbon monoxide, for example, at silver, gold, zinc, palladium and gallium cathodes, a multitude of hydrocarbons form as reaction products at a copper cathode. At a silver cathode, however, predominantly carbon monoxide and little hydrogen would form. The reactions at anode and cathode can be represented by way of example by the following reaction equations:

$$2CO_2 + 4e^- + 4H^+ \rightarrow 2CO + 2H_2O \qquad \text{Cathode:}$$

$$2H_2O \rightarrow 4H^+ + 4e^- \qquad \text{Anode:}$$

Of particular economic interest is, for example, the electrochemical production of carbon monoxide, methane or ethene (ethylene), and also of other substances.

Examples $$CO_2 + 2e^- + H_2O \rightarrow CO + 2OH^- \qquad \text{Carbon monoxide:}$$

$$2CO_2 + 12e^- + 8H_2O \rightarrow C_2H_4 + 12OH^- \qquad \text{Ethylene:}$$

$$CO_2 + 8e^- + 6H_2O \rightarrow CH_4 + 8OH^- \qquad \text{Methane:}$$

$$2CO_2 + 12e^- + 9H_2O \rightarrow C_2H_5OH + 12OH^- \qquad \text{Ethanol:}$$

$$2CO_2 + 10e^- + 8H_2O \rightarrow HOC_2H_4OH + 10OH^- \qquad \text{Monoethylene glycol:}$$

In the last few years, there been an increase in systematic studies of the electrochemical reduction of CO$_2$. In spite of many efforts, no one has developed an electrochemical system with which it was possible to reduce CO$_2$ with sufficiently high current density and acceptable yield in a manner with long-term stability and in an energetically favorable manner relative to competing energy carriers. Owing to the increasing scarcity of fossil fuel resources and the volatile availability of renewable energy sources, research into CO$_2$ reduction is gaining ever greater attention. In this way, CO$_2$ emissions would be reduced and CO$_2$ could be utilized as an inexpensive carbon source.

To assure a high current density and in attempts to increase it further, all that has been considered to date is carbon dioxide reduction at the catalytically active cathode surface. Electrolysis cells suitable for electrochemical reduction of carbon dioxide typically consist of at least one cathode space and one anode space, and, in some cases, a gas space, etc. To achieve an effective conversion of the $CO_2$ used, the cathode has been a porous gas diffusion electrode usually consisting of a mixture of an inorganic metal catalyst (e.g. Ag, Au, Cu, Pb, etc.) and an organic binder (e.g. PTFE (polytetrafluoro-ethylene), PVDF (polyvinylidene difluoride), PFA (perfluoro-alkoxy polymers), FEP (fluorinated ethylene-propylene copolymers), PFSA (perfluorosulfonic acid polymers)). For adjustment of hydrophilicity, it is also possible to use hydrophilic materials such as polysulfones, e.g. polyphenyl sulfones, polyimides, polybenzoxazoles or polyether ketones, or generally polymers that are electrochemically stable in the electrolyte, including, for example, polymerized ionic liquids, or organic conductors such as PEDOT:PSS or PANI (camphorsulfonic acid-doped polyaniline). The electrodes prepared are characterized by a high connectivity of the pores and a broad pore radius distribution.

In the prior art, the current densities of known methods without gas diffusion electrodes are typically well below the values of <100 mA/cm$^2$ that are relevant for industrial utilization. Current densities of industrial relevance can be achieved using gas diffusion electrodes. This is known from the prior art, for example, for chloralkali electrolysis operated on an industrial scale.

For example, silver/silver oxide/PTFE-based gas diffusion electrodes have recently been used on the industrial scale for the production of sodium hydroxide solution in the existing chloralkali electrolysis process (oxygen-depolarized electrodes). The efficiency of the chloralkali electrolysis process can be increased by 30-40% relative to conventional electrodes. The methodology of the embedding of catalyst with PTFE is known from a multitude of publications and patents. The methodology of the "dry process" is based on a roll calendering process using PTFE/catalyst powders.

The corresponding technique originates from a 1988 patent, EP0297377A2, wherein electrodes based on $Mn_2O_3$ were produced for batteries. DE 3710168A1 describes application of the dry process with regard to the preparation of metallic electrocatalyst electrodes. The technique was additionally used in patents for production of silver-based (silver (I) or silver(II) oxide) gas diffusion electrodes (oxygen-depolarized electrodes). Patents EP2444526A2 and DE102005023615A1 mention mixtures having a binder content of 0.5-7%. The carrier used was Ag or nickel meshes having a wire diameter of 0.1-0.3 mm and a mesh size of 0.2-1.2 mm. The powder is applied directly to the mesh before it is supplied to the roll calender.

DE10148599 A1 and EP0115845B1 describe a similar process in which the powder mixture is first extruded to give a sheet or film, which is pressed onto the mesh in a further step, as shown in schematic form by FIG. 8 for example, with application of the catalyst material 6 to the mesh 7 and calendering to give the gas diffusion electrode GDE in a two-stage calendering process.

The latter method is less suitable than the one-step process owing to relatively low mechanical stability. EP2410079A2 describes the one-stage process for production of a silver-based oxygen-depolarized electrode comprising the addition of metal oxide supplements such as $TiO_2$, $Fe_3O_4$, $Fe_2O_3$, $NiO_2$, $Y_2O_3$, $Mn_2O_3$, $Mn_5O_8$, $WO_3$, $CeO_2$, spinels such as $CoAl_2O_4$, $Co(AlCr)_2O_4$, inverse spinels such as $(Co, Ni, Zn)_2$ $(Ti, Al)O_4$, and perovskites such as $LaNiO_3$, $ZnFe_2O_4$.

Likewise identified as being suitable were supplements of silicon nitride, boron nitride, TiN, AlN, SiC, TiC, CrC, WC, $Cr_3C_2$, TiCN or oxides of the $ZrO_2$, $WO_3$ type. The materials are declared here as filler. The aim here is explicitly the reduction of the hydrophobic character of the electrode.

DE10335184A1 describes catalysts that can be used as an alternative for the oxygen-depolarized electrodes, such as precious metals, e.g. Pt, Rh, Ir, Re, Pd, precious metal alloys, e.g. Pt—Ru, precious metal compounds, e.g. precious metal-containing sulfides and oxides, and Chevrel phases, e.g. $Mo_4Ru_2Se_8$ or $Mo_4Ru_2S_8$, where these may also contain Pt, Rh, Re, Pd, etc.

Known Cu-based gas diffusion electrodes for production of hydrocarbons based on $CO_2$ are mentioned, for example, in the studies by R. Cook [J. Electrochem. Soc., vol. 137, no. 2, 1990], where a wet-chemical method based on a PTFE 30B (suspension)/Cu(OAc)$_2$/Vulkan XC 72 mixture is mentioned. The method states how a hydrophobic conductive gas transport layer is applied using three coating cycles, and a catalyst-containing layer using three further coating operations. Each application of a layer is followed by a drying phase (325° C.) with a subsequent static pressing operation (1000-5000 psi). For the electrode obtained, a Faraday efficiency of >60% and a current density of >400 mA/cm$^2$ were reported. Reproduction experiments demonstrate that the static pressing method described does not lead to stable electrodes. An adverse effect of the added Vulkan XC 72 was likewise found, and so likewise no hydrocarbons were obtained.

The calendering methods described lead to highly porous single-layer electrodes characterized by low flow resistances or low bubble points of about 5-20 mbar. As a result of the high porosity (50-70%) or large pore opening radii that are caused by such a mode of production, the correspondingly prepared electrodes have very narrow operating windows within the $CO_2$ electrolysis in aqueous electrolytes. This is usually characterized in that cations, for example Li$^+$, K$^+$, Na$^+$, Cs$^+$, in the electrolyte penetrate into the porous structure as a result of the electrical attraction of the cathode, where they can form hydrogencarbonates according to the reaction equation below with OH$^-$ ions formed and absorbed $CO_2$, and these often precipitate out at relatively high current density owing to the high salt content of the electrolyte.

$$M^+ + CO_2 + OH^- \rightarrow MHCO_3 \downarrow$$

A further unwanted subsequent effect is that the passive penetration of water by diffusion along the concentration gradient (osmosis) is observed, also known as the "water admission pressure" effect. As a consequence of the salination described, according to the amount of salt and moisture content, there can be complete blockage of the pore structure in that anions are produced and diffuse more slowly out of the pores than cations are electrostatically pulled in. As well as complete blockage by salt crystals, there is the possibility of complete flooding with electrolyte, such that it can emerge continuously on the reverse side. Both boundary conditions lead to collapse of stable operation and have a direct effect on the ascertained product Faraday efficiencies or on the achievable current density. The latter phenomenon is also known from the field of chloralkali electrolysis and has been viewed critically in DE102010054643A1 and in EP2398101A1, since the liquid passing through can form a continuous film on the reverse side that can prevent further ingress of gas into the pore system.

In the ideal state of operation of the gas diffusion electrode, however, stable formation of the three-phase catalyst/electrolyte/gas boundary should be assured. A further criterion is the bubble point of the gas diffusion electrode, which, owing to the high porosity in the case of calendered electrodes, is very low in the range of 5-20 mbar.

Electrodes having low bubble points react relatively strongly to fluctuations in pressure, and so closed-loop control of the pressure differential (backpressure of the $CO_2$ downstream of the electrode) by a pressure differential regulator in an industrial application is complicated, as can be seen, for example, in DE102013011298A1, and a more complicated closed-loop control loop with the closed-loop control parameters of gas composition, pressure and volume flow rate may be required.

There are studies known from the field of research of the electrochemical reduction of $CO_2$ that use an MEA (membrane electrode assembly) and are similar to the concepts for electrochemical reduction of $CO_2$ in ion exchange electrolyzers with solid electrolyte. U.S. Pat. No. 9,481,939B2 and US 2016/0251766A1 describe, for example, a process for the electrochemical reduction of $CO_2$ which aims for CO as target product and in which a vinylbenzene ionomer modified with imidazolium groups is used, poly(1-(p-vinylbenzyl)-3-methylimidazolium). Further functional anion exchange groups described are 1-(2-hydroxyethyl)imidazolium moieties. The polymer backbone used is mainly polyvinylbenzyl structures. Likewise described are copolymers of vinylbenzyl chloride and styrene, poly(4-VBC-co-St). Also additionally mentioned is poly(2,6-dimethyl-1,4-phenylene oxide). In the process described, anode and cathode are in direct contact with the membrane. The electrodes are manufactured on the basis of catalyst-coated carbon paper (GDL) (Sigracet 35 BC). These are not all-active catalyst gas diffusion electrodes. Reproduction experiments led to stability problems with ionomer on the anode side.

For the electrochemical reduction of $CO_2$ to methanol, U.S. Pat. No. 7,704,369B2 additionally proposes alkylammonium halides as electrolyte in aqueous mixtures. Journal of Power Sources 223 (2013), p. 68-73, describes a method in which an electrolyte-free cathode made of tin is used. The process is based on a cation exchange membrane having an electrode arrangement known from the field of fuel cells.

D. Dewolf, Catalysis Letters (1988), (1), p. 73-83 uses a liquid-free copper/Nafion-based electrode which is likewise employed in an electrolyzer with cation exchange membrane. Target products mentioned are methane and ethylene with very low current densities of 1 mA/cm$^2$.

L. Aeshala, Separation and Purification Technology 2012 (94), p. 131-137 likewise describes a process with copper catalyst in an arrangement with solid electrolyte, e.g. Nafion, Speek, alkali-doped PVA. A further publication from this group (L. Aeshala, Journal of $CO_2$ Utilization, 2013 (3), p. 49-55) likewise describes copper catalysts having solid anion and cation exchange electrolytes as MEA and not as a constituent of the electrode itself, namely acid-doped CMI 7000 and alkali-doped AMI 7001. An improvement to the process was described in Phys. Chem. Chem. Phys. 2014, (16), p. 17588-17594, which includes the modification of the solid electrolyte with functional groups (alkali-doped PVA/PEI).

S. Shironita, J. Power Sources, 2013 (228), p. 68-74 describes a reversible methanol fuel cell for production of methanol by electroreduction of $CO_2$. Pt—Ru/C catalysts with an MEA construction were used.

The electrodes used in the processes described are based on catalyst-coated carbon fiber GDL structures that come from the field of development of fuel cells and are typically unsuitable for industrially implemented electrolysis methods owing to the low mechanical stability. A further disadvantage is usually the carbon black or carbon constituent which usually includes impurities of transition metals such as Ni, Fe, and hence increases the unwanted formation of hydrogen. The adhesion of the catalyst particles on the GDL structure is typically likewise insufficient, and so, in the case of operation over several hundreds to thousands of hours, significant loss of catalyst occurs. A similar problem can additionally be observed in the renewal of membranes, since a majority of the catalyst can be lost in the separation of GDL and membrane. Gas diffusion electrodes constructed by the all-active catalyst concept have essential advantages over these methods.

Applicability of the ionic binding of such electrodes to a membrane is not known to date.

Anion exchange membranes are known from other fields of application, for example electrodialysis, but these have not been catalyst-modified. The use of ion exchange resins in electrolysis cells is known from the field of exchanger regeneration by means of electrode ionization (EDI). However, these processes differ fundamentally from the electrochemical reduction of $CO_2$.

The use of gas diffusion electrodes within the electroreduction of $CO_2$ in aqueous electrolyte solutions is typically possible within a relatively narrow process window over a prolonged period >1000 h. Anode space and cathode space are typically kept separate from one another in a $CO_2$ electrolyzer with a cation/anion-selective membrane or a diaphragm. This prevents mixing of the gaseous substances of value formed at the cathode and at the anode.

Even though the membranes used are virtually impermeable to gases, they have to be permeable to ionic charge carriers. Since the membranes typically used, in chemical terms, are solid acids, the charge transport can usually only be effected by positively charged species such as protons or electrolyte cations (e.g. $Li^+$; $Na^+$; $K^+$; $Rb^+$; $Cs^+$; $NRR'R''R'''^+$ where R, R', R'', R''' may be identical or different organic radicals and/or D, H).

The effect of this is that, during the electrolysis operation, the cation concentrations of anolyte and catholyte diverge. In the catholyte, the charge of the incoming cations is balanced out by the hydroxide ions that form at the cathode, which can react further to give hydrogencarbonate or carbonate ions. As a result, there is a constant rise in the concentration of carbonates in the catholyte, and a possible rise in the pH up to the $HCO_3^-/CO_2$ equilibrium. In operation, in the worst case, there could be precipitation of insoluble salts in the catholyte or on or in the electrode.

In the anolyte, the missing cations are replaced by protons generated at the anode. This usually leads either to development of acid in the anolyte, which leads to a drop in the pH, or, in the case of hydroxide or carbonate electrolytes, for example, to neutralization of the anions. In the former case, the anolyte could be converted to pure water. A further problem is the migration of salts into the porous electrode itself. If the electrode is not itself ion-conductive, binding of the electrochemically active sites to water and ion transport can only be effected via partial penetration of the electrode with the liquid electrolyte. For charge balancing at the cathode, however, typically two driving forces should be noted: firstly the electrostatic attraction of the electrolyte cations; secondly, anionic species, generally hydrogencarbonate ions, are produced at the cathode, which require a cation for charge balancing. This creates a concentration gradient that likewise leads to penetration of cations into the electrode.

Frequently, the extent of this charge compensation extends beyond the degree necessary for ionic binding. Owing to electroosmosis, it is also possible for electrolyte to get onto the side of the electrode remote from the electrolyte chamber. In one boundary case, this can lead to pore blockage, such that there may be unwanted undersupply of the catalyst with $CO_2$. As a further boundary case, significant passage of the aqueous medium through the pores could be observed, which can contribute to flooding of the pore system and likewise to $CO_2$ undersupply of the catalyst.

This problem is frequently observed in electrolyzer constructions in which the cathode is in direct contact with a liquid, salt-containing electrolyte. A further possible problem with this variant is the flooding of the pores with electrolyte. A known cause of the penetration of electrolyte into the pores of the electrode can be the hydrostatic pressure of the water column in the electrolyte gap, which limits the technical construction height of the electrolysis cells. In operation, it is also possible to observe increasing salt crystallization of hydrogencarbonates in the region of the side remote from the electrolyte, which, in a boundary case, can lead to pore blockage, such that there is unwanted undersupply of the catalyst with $CO_2$. As a further boundary case, significant passage of the aqueous medium through the pores can be observed, which contributes to flooding of the pore system and likewise to $CO_2$ undersupply of the catalyst. A stable operating state can be achieved with the avoidance of the boundary cases mentioned.

Consequently, it is found to be necessary for technical purposes to broaden the stable operating window for an industrial application of the technology in order to assure more efficient conversion of the $CO_2$ in the long-term operation of large cells, in order to avoid the disadvantages known from the prior art.

SUMMARY

The teachings of the present disclosure describe gas diffusion electrodes with elevated bubble points and elevated wetting pressures, in order to broaden the operating window of the gas diffusion electrodes and to prevent salination or electrolyte passage. Some embodiments include a gas diffusion electrodes for carbon dioxide utilization by way of an alternative or an improved process.

For example, some embodiments include a gas diffusion electrode comprising a metal M selected from Ag, Au, Cu, Pd and mixtures and/or alloys and/or salts thereof, and at least one binder, wherein the gas diffusion electrode comprises hydrophilic and hydrophobic pores and/or channels, wherein an ion transport material is present at least to some degree in the pores and/or channels of the gas diffusion electrode, wherein the ion transport material is an anion transport material.

In some embodiments, the ion transport material is an ion transport resin.

In some embodiments, an ion transport material has been applied to at least some of the surface of the gas diffusion electrode.

In some embodiments, the anion transport material is stable at a pH of more than 7 and/or does not have any imidazolium, pyridinium and/or β-hydrogen-containing groups.

In some embodiments, the anion transport material has quaternary alkylammonium groups that have preferably been methylated.

In some embodiments, the anion transport material has been at least partly fluorinated.

In some embodiments, the anion transport material also has OH groups and/or $NH_2$ groups.

In some embodiments, there is a carrier, preferably in the form of a sheetlike structure, and a layer comprising the metal M, the ion transport material and at least one binder, wherein the layer comprises hydrophilic and hydrophobic pores and/or channels, wherein the proportion by weight of the ion transport material in the layer is preferably greater than the proportion by weight of the binder.

In some embodiments, there is a carrier, e.g., in the form of a sheetlike structure, and a first layer comprising the metal M, the ion transport material and optionally at least one binder, wherein the first layer comprises hydrophilic and optionally hydrophobic pores and/or channels, further comprising a second layer comprising the metal M and at least one binder, wherein the second layer is present atop the carrier and the first layer atop the second layer, wherein the binder content in the first layer is preferably less than in the second layer, wherein the second layer comprises hydrophobic pores and/or channels, further preferably wherein the second layer includes 3-30% by weight of binder, preferably 10-30% by weight of binder, further preferably 10-20% by weight of binder, based on the second layer, and the first layer further includes 0-10% by weight of binder, preferably 0.1-10% by weight of binder, 1-7% by weight of binder, or even 3-7% by weight of binder, based on the first layer.

As another example, some embodiments include an electrolysis cell comprising a gas diffusion electrode as described above as cathode.

In some embodiments, there is an anode and at least one membrane and/or at least one diaphragm between the cathode and anode, e.g., at least one anion exchange membrane and/or one anion exchange diaphragm.

In some embodiments, at least one membrane and/or one diaphragm, e.g. the anion exchange membrane and/or the anion exchange diaphragm, is not in contact with the anode, with provision of at least one further membrane and/or one further diaphragm between the anion exchange membrane and/or the anion exchange diaphragm and the anode.

As another example, some embodiments include a method of electrolysis of $CO_2$ and/or CO, wherein a gas diffusion electrode as described above is used as cathode, or wherein an electrolysis cell as described above is used.

As another example, some embodiments include a process for producing a gas diffusion electrode, comprising a metal M selected from Ag, Au, Cu, Pd and mixtures and/or alloys and/or salts thereof, and at least one binder, wherein the gas diffusion electrode comprises hydrophilic and hydrophobic pores and/or channels, wherein an ion transport material is present at least to some degree in the pores and/or channels of the gas diffusion electrode, comprising production of a mixture comprising at least the metal M, the ion transport material and the at least one binder, application of the mixture comprising at least the metal M, the ion transport material and the at least one binder to a carrier, e.g. in the form of a sheetlike structure, and dry or moistened rolling of the mixture onto the carrier to form a layer; or production of a first mixture comprising at least the metal M, the ion transport material and optionally at least one binder, production of a second mixture comprising at least the metal M and at least one binder, application of the second mixture comprising at least the metal M and the at least one binder to a carrier, preferably in the form of a sheetlike structure, application of the first mixture comprising at least the metal M, the ion transport material and optionally at least one binder to the second mixture, optional application of further mixtures to the first mixture, and dry or moistened rolling of the second and first mixture and any further mixtures onto the carrier to form a second and a first layer and optionally further layers; or provision of a gas diffusion electrode comprising a metal M selected from Ag, Au, Cu, Pd and mixtures and/or alloys and/or salts thereof, and at least one binder, wherein the gas diffusion electrode comprises hydrophilic and hydrophobic pores and/or channels, and at least partial introduction of an ion transport material into the pores and/or channels of the gas diffusion electrode, wherein the ion transport material is an anion transport material.

As another example, some embodiments include an electrolysis system comprising a gas diffusion electrode as described above, or an electrolysis cell as described above.

BRIEF DESCRIPTION OF THE DRAWINGS

The appended drawings illustrate embodiments of the teachings of the present disclosure and impart further understanding thereof without limiting its scope. In connection with the description, they serve to elucidate concepts and principles of the teachings. Other embodiments and many of the advantages mentioned are apparent with regard to the drawings. The elements of the drawings are not necessarily shown true to scale with respect to one another. Elements, features and components that are the same, have the same function and the same effect are each given the same reference numerals in the figures of the drawing, unless stated otherwise.

FIG. 1 shows an illustrative diagram of a possible construction of an electrolysis cell in one embodiment incorporating teachings of the present disclosure.

FIG. 2 shows a further illustrative diagram of a possible construction of an electrolysis cell in one embodiment incorporating teachings of the present disclosure.

FIG. 3 shows a third illustrative diagram of a possible construction of an electrolysis cell in one embodiment incorporating teachings of the present disclosure.

FIG. 4 shows a fourth illustrative diagram of a possible construction of an electrolysis cell in one embodiment incorporating teachings of the present disclosure.

FIGS. 11 to 14 show illustrative embodiments of electrolysis cells incorporating teachings of the present disclosure with a possible gas supply ($CO_2$ here, for example) and electrolyte supply.

FIGS. 24 to 28 show, in schematic form, the effect of an anion transport material in an illustrative gas diffusion electrode incorporating teachings of the present disclosure during operation.

FIG. 29 shows a further illustrative diagram of a possible construction of an electrolysis cell in one embodiment incorporating teachings of the present disclosure.

DETAILED DESCRIPTION

Figure 5:
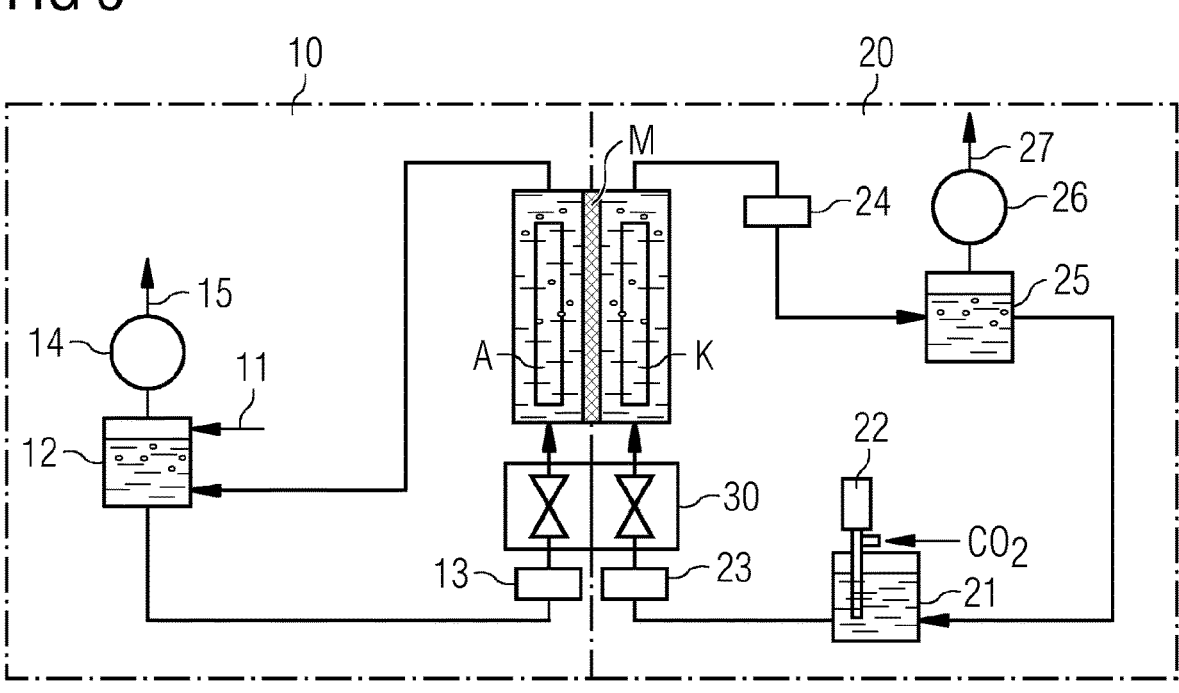
FIG. 5 shows one configuration of an electrolysis system for $CO_2$ reduction.

In cell constructions with an electrolyte gap between cathode and membrane/diaphragm, in $CO_2$ operation, salt deposits in the gas diffusion electrode occur especially at relatively high operating temperatures, which lead to failure of the GDE. Secondly, in cell constructions without an electrolyte gap or in the case of use of an M/DEA (membrane/diaphragm electrode assembly) with a gas diffusion electrode as cathode, in electrolysis operation, there can be severe salt formation/deposition in the region of the interface between the gas diffusion electrode (cathode) and the separator membrane/diaphragm as well, and so stable electrolysis operation is not assured. Salt formation/deposition is also independent of whether the anode is present directly on the membrane or whether a separate electrolyte gap has been provided in the cell.

The cause of this is probably the above-described formation of hydrogencarbonate ions during the electrolysis and the resultant formation of hydrogencarbonate salts from the cations transported through the membrane. Without liquid electrolyte or sufficiently active anion transport, these or their salts typically cannot be removed. Particularly in the case of M/DEA, the enrichment of the electrolyte cations in the region of the interface is typically attributable to electroosmosis. In that case, a concentration gradient cannot be simply dissipated here on the electrode side since a catalyst-based gas diffusion electrode usually has only very poor anion conductivity or has not been provided at all to date.

For improvement of the operational stability, in the context of the present disclosure, ion transporters, especially anion transport resins, are used as binder material or as additive in order, for example, to rapidly conduct away or partly buffer OH ions that form, such that the reaction with $CO_2$ and the associated formation of hydrogencarbonates can be reduced, or the anion transport resins themselves conduct $HCO_3$. In principle, anion transport can be effected by anion exchangers. Since anion exchangers in particular contain cationic functions, counterions are intrinsically already present for charge compensation of the hydrogencarbonate ions formed, and no penetration of cations into the electrode is required any longer.

Instead, transport or displacement of anions from the electrode can be enabled. It is important to emphasize here that the anion transport resins need not necessarily have an anion exchange function. It is sufficient when the functionalized resins, especially functionalized with $OH^-$ or $HCO_3^-$, have sufficient anion mobility. The ion exchange resins, especially anion exchange resins, thus simultaneously also provide a pathway by which, for example, hydroxide or hydrogencarbonate anions can be transported away from the cathode in the direction of the electrical field, such that it is no longer necessary to employ any further cations from the electrolyte for charge compensation, which can in turn cause crystallization of salts and hence blockage of the GDE.

In addition, specifically an integrated anion exchanger constitutes a blockage for cations, which can additionally counteract deposition of salt. It is unimportant here whether the electrode has been fully permeated with the anion transporter. The anion transport functionality is important in the direction of the electrolyte or in the active region of the GDE.

In a first aspect, a gas diffusion electrode is disclosed, comprising a metal M selected from Ag, Au, Cu, Pd and mixtures and/or alloys and/or salts thereof, and at least one binder, wherein the gas diffusion electrode comprises hydrophilic and hydrophobic pores and/or channels, wherein an ion transport material is present at least to some degree in the pores and/or channels of the gas diffusion electrode, wherein the ion transport material is an anion transport material. In one configuration of the invention, an ion transport material has been applied to at least some of the surface of the gas diffusion electrode.

The teachings of the present disclosure additionally relate to an electrolysis cell comprising a gas diffusion electrode incorporating the teachings herein as a cathode, and to an electrolysis system comprising a gas diffusion electrode or an electrolysis cell incorporating the teachings herein. Some embodiments include methods of electrolysis of $CO_2$ and/or CO, wherein a gas diffusion electrode incorporating the teachings herein is used as a cathode, or wherein an electrolysis cell incorporating the teachings herein is used, and also the use of the gas diffusion electrode or of the electrolysis cell in the electrolysis of $CO_2$ and/or CO.

Some embodiments include processes for producing a gas diffusion electrode, comprising a metal M selected from Ag, Au, Cu, Pd and mixtures and/or alloys and/or salts thereof, and at least one binder, wherein the gas diffusion electrode comprises hydrophilic and hydrophobic pores and/or channels, wherein an ion transport material is present at least to some degree in the pores and/or channels of the gas diffusion electrode, comprising

- production of a first mixture comprising at least the metal M, the ion transport material and the at least one binder,
- application of the first mixture comprising at least the metal M, the ion transport material and the at least one binder to a carrier, e.g., in the form of a sheetlike structure, and
- dry rolling of the first mixture onto the carrier to form a first layer; or
- production of a first mixture comprising at least the metal M, the ion transport material and optionally at least one binder,
- production of a second mixture comprising at least the metal M and at least one binder,
- application of the second mixture comprising at least the metal M and the at least one binder to a carrier, e.g. in the form of a sheetlike structure,
- application of the first mixture comprising at least the metal M, the ion transport material and optionally at least one binder to the second mixture,
- optional application of further mixtures to the first mixture, and
- dry rolling of the second and first mixture and any further mixtures onto the carrier to form a second and a first layer and optionally further layers; or
- provision of a gas diffusion electrode comprising a metal M selected from Ag, Au, Cu, Pd and mixtures and/or alloys and/or salts thereof, and at least one binder, wherein the gas diffusion electrode comprises hydrophilic and hydrophobic pores and/or channels, and
- at least partial introduction of an ion transport material into the pores and/or channels of the gas diffusion electrode.

The ion transport material here may comprise an anion transport material.

Unless defined differently, the technical and scientific expressions used herein have the same meaning as commonly understood by a person skilled in the art in the technical field of the disclosure.

"Hydrophobic" in the context of the present disclosure is understood to mean water-repellent. Hydrophobic pores and/or channels are those that repel water. More particularly, hydrophobic properties are associated with substances or molecules having nonpolar groups. "Hydrophilic", by contrast, is understood to mean the ability to interact with water and other polar substances.

In the present disclosure, statements of amount are based on % by weight, unless stated otherwise or apparent from the context. In the gas diffusion electrodes described herein, the percentages by weight add up to 100% by weight. Standard pressure is 101 325 Pa=1.01325 bar.

Some embodiments include gas diffusion electrodes (GDEs) comprising a metal M selected from Ag, Au, Cu, Pd and mixtures and/or alloys and/or salts thereof, and at least one binder, wherein the gas diffusion electrode comprises hydrophilic and hydrophobic pores and/or channels, wherein an ion transport material is present at least to some degree in the pores and/or channels of the gas diffusion electrode and/or has been applied to at least some of the surface of the gas diffusion electrode. In some embodiments, the ion transport material is present at least to some degree in the pores and/or channels of the gas diffusion electrode. In some embodiments, the ion exchange material is present at least to some degree in the pores and/or channels of the gas diffusion electrode and has been applied to at least some of the surface of the gas diffusion electrode.

The metal M may serve either as catalyst or as electron conductor in the gas diffusion electrode. In some embodiments, the metal M is selected from Cu, Ag, Au, Pd, and mixtures and/or alloys and/or salts thereof. The metal M may be selected from Cu, Ag and mixtures and/or alloys and/or salts thereof, especially Ag and/or alloys and/or salts thereof. The salts of the metal M here are, for example, charged compounds of the metal M in which the metal M is in the form of a cation, e.g. as $M^+$ and/or $M^{2+}$ (especially $Cu^{2+}$ and/or $Pd^{2+}$), especially $M^+$, and which contribute to catalytic reduction. The counterions in these salts are not particularly restricted.

The proportion of metal M in the gas diffusion electrode of the invention is not particularly restricted and may be between 30% and 99.8% by weight, based on the weight of the gas diffusion electrode, e.g. 40% by weight or more and 96% by weight or less, or 50% by weight or more and 92% by weight or less, or 65% by weight or more and 85% by weight or less.

In some embodiments, the metal M in the gas diffusion electrode is present either as elemental metal M or in cationic form, e.g. as $M^+$ and/or $M^{2+}$ (especially Cu and/or Pd), or $M^+$.

In addition, the at least one binder present in the gas diffusion electrode is not particularly restricted either, and it is also possible for two or more different binders to be used, including in different layers of the electrode. The binding agent or the binder for the gas diffusion electrode, if present, is not particularly restricted and includes, for example, a hydrophilic and/or hydrophobic polymer, for example a hydrophobic polymer. In some embodiments, the at least one binder is an organic binder, for example selected from PTFE (polytetrafluoroethylene), PVDF (polyvinylidene difluoride), PFA (perfluoroalkoxy polymers), FEP (fluorinated ethylene-propylene copolymers), PFSA (perfluorosulfonic acid polymers), and mixtures thereof, especially PTFE.

Hydrophilicity can also be adjusted using hydrophilic materials such as polysulfones, i.e. polyphenyl sulfones, polyimides, polybenzoxazoles or polyether ketones, or generally polymers that are electrochemically stable in the electrolyte, also including, for example, polymerized ionic liquids, or organic conductors such as PEDOT:PSS or PANI (camphorsulfonic acid-doped polyaniline).

In this way, it is possible to achieve a suitable adjustment of the hydrophobic pores or channels. In some embodiments, the gas diffusion electrode can be produced using PTFE particles having a particle diameter between 0.01 and 95 μm, e.g. between 0.05 and 70 μm, between 0.1 and 40 μm, 0.3 to 20 μm, 0.5 to 20 μm, or about 0.5 μm. Suitable PTFE powders include, for example, Dyneon® TF 9205 or Dyneon TF 1750. Suitable binder particles, for example PTFE particles, may, for example, be approximately spherical, for example spherical, and may be produced, for example, by emulsion polymerization. In some embodiments, the binder particles are free of surface-active substances. The particle size can be determined here, for example, according to ISO 13321 or D4894-98a and may correspond, for example, to the manufacturer data (e.g. TF 9205: average particle size 8 μm to ISO 13321; TF 1750: average particle size 25 μm to ASTM D4894-98a).

The binder may be present, for example, in a proportion of 0.1% to 50% by weight, for example when a hydrophilic ion transport material is used, for example 0.1% to 30% by weight, from 0.1% to 25% by weight, for example 0.1% to 20% by weight, further preferably from 3% to 20% by weight, 3% to 10% by weight, or 5% to 10% by weight, based on the gas diffusion electrode. In some embodiments, the binder has marked shear-thinning characteristics, such that fiber formation takes place during the mixing process. In some embodiments, fibers formed in the course of production should wind around the particles without fully enveloping the surface. The optimal mixing time can be determined, for example, by direct visualization of fiber formation in a scanning electron microscope.

In some embodiments, the at least one binder is stable at a pH of 7 or more, stable in a strongly basic environment, for example at a pH of 9 or more, for example 10 or more.

In some embodiments, at least in a sub-region of the GDE, for example on a side facing an electrolyte in operation, the metal M, the at least one binder and the ion transport material, for example an ion exchange resin, for example an anion transport material such as an anion exchange resin, are distributed essentially homogeneously.

The ion transport material, for example an ion exchange material, is not particularly restricted and may, for example, be an ion transport resin, for example an ion exchange resin, or else another ion transport material, for example an ion exchange material, for example a zeolite etc. In some embodiments, the ion transport material is an ion exchange resin. This is not particularly restricted in this context.

In some embodiments, the ion transport material is an anion transport material, for example an anion exchange resin. In some embodiments, the anion transport material or the anion transporter is an anion exchange material, for example an anion exchange resin. In some embodiments, the ion transport material also has a cation blocker function, i.e. can prevent or at least reduce penetration of cations into the gas diffusion electrode.

Specifically an integrated anion transporter or an anion transport material with fixedly bound cations may constitute a blockage here for mobile cations by coulombic repulsion, which can additionally counteract deposition of salts, especially within the gas diffusion electrode. It is unimportant here whether the gas diffusion electrode has been fully permeated by the anion transporter. What is important is the anion transport functionality in the direction of the electrolyte or in the active region of the GDE. In some embodiments, the anion transport material, for example an anion exchange material, is thus at least partly on a side of the gas diffusion electrode facing an electrolyte, especially at least partly in the pores and/or channels of the gas diffusion electrode facing an electrolyte, for example on a side arranged opposite a gas side of the gas diffusion electrode on which a gas such as $CO_2$ and/or CO is supplied or past which it is guided.

Figure 24:
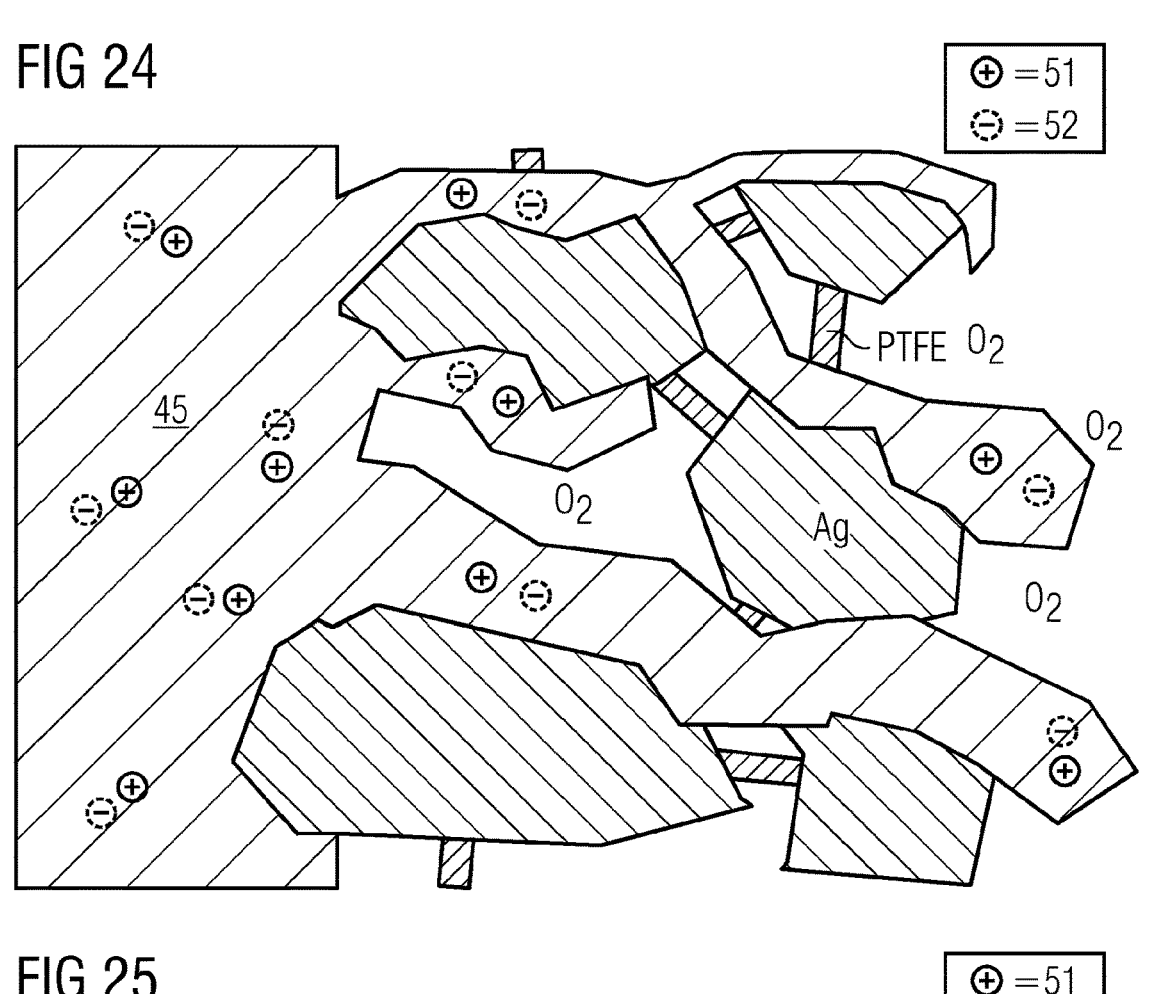

Integration of cation transport, for example a cation exchange functionality, may be disadvantageous here since it can firstly promote hydrogen formation, and can secondly provide pathways for cations of the electrolyte that can lead to deposition of salts. The advantages of anion transport by means of an anion exchange material, especially at least to some degree in pores and/or channels of the gas diffusion electrode, especially on a side of the gas diffusion electrode facing an electrolyte, are illustrated hereinafter. First of all, however, it is to be shown that addition of anion transport is not absolutely necessary for the operation of a GDE, for example an oxygen-depolarized cathode, up to high current densities, for example above 500 mA/cm² FIG. 24 depicts the ground state of an illustrative GDE, for example an oxygen-depolarized cathode or a GDE for conversion of $CO_2$ and/or CO, without applied voltage. The electrolyte 45 here can penetrate the catalyst of porous structure, here an illustrative silver catalyst Ag, using PTFE here by way of example as binder material. All cations (e.g. K$^+$) are balanced by anions (e.g. $HCO_3^-$ or $SO_4^{2-}$), with mobile cations 51 and mobile anions 52 shown here by way of example. If voltage is then applied, in the case of an oxygen-depolarized cathode or in general, when $O_2$, for example, is present in a gas to be converted, the following empirical reaction can take place:

$$2e^- + H_2O + \tfrac{1}{2}O_2 \rightarrow 2OH^-$$

Figure 25:
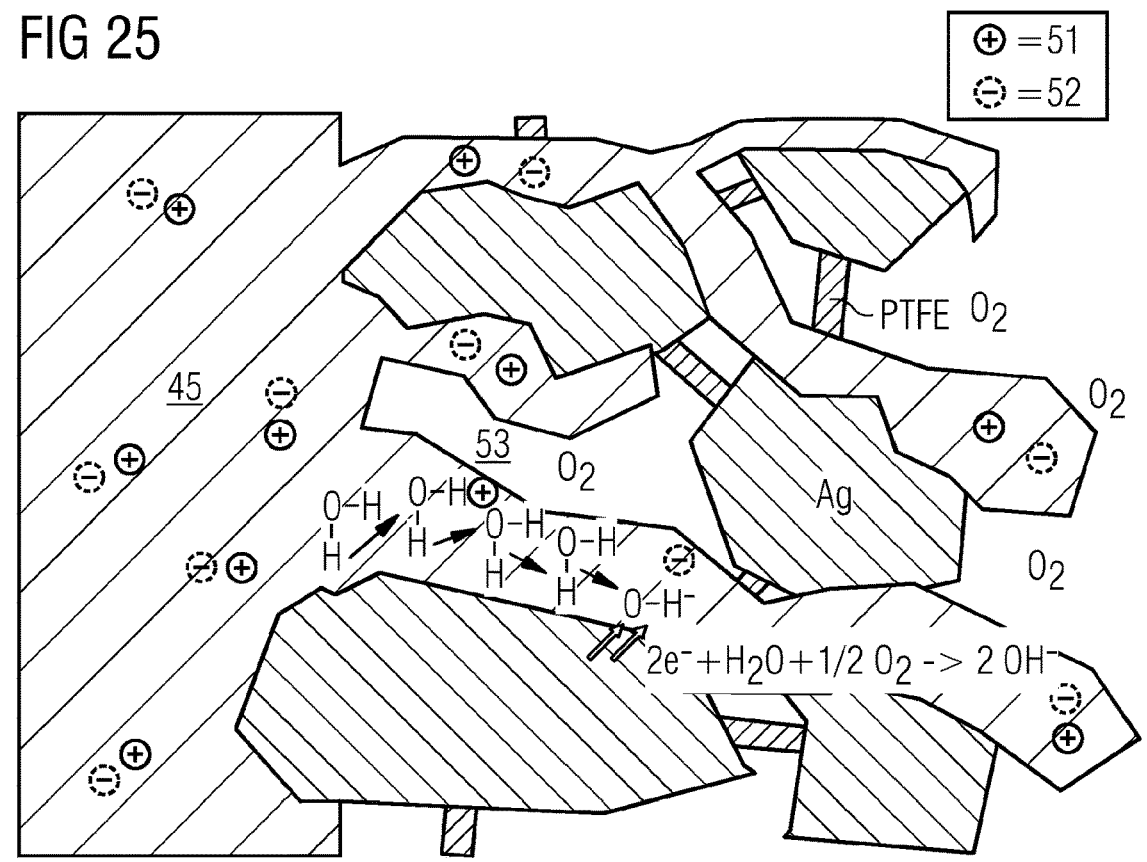

The hydroxide ions formed by way of example are now to diffuse out of the gas diffusion electrode. Inward diffusion of cations is to be suppressed since there can otherwise be crystallization of salts. The diffusion of cations is usually several orders of magnitude slower than the diffusion of the hydroxide ions. This is because the cations have to "migrate", while hydroxide ions, as a result of the Grotthus tunnel effect or Grotthus effect 53, can be transported effectively without energy expenditure into the bulk electrolyte or electrolyte 45, as shown by way of example in FIG. 25, with application of a voltage on the GDE.

As shown above, the same electrode can also be used for reduction of $CO_2$, for example, to CO. Analogously to the reduction of oxygen, two hydroxide ions are formed in the reduction of $CO_2$.

$$2e^- + CO_2 + H_2O \rightarrow 2OH^- + CO$$

The CO formed diffuses out of the electrode and can be discharged together with the electrolyte and/or the gas stream. The hydroxide ions formed can likewise be transported out of the electrode via the Grotthus mechanism. This reaction is adequate up to a certain current density (e.g. ~150 mA/cm²) and low temperature (e.g. <30° C.) to assure stable operation.

Figures 26, 27:
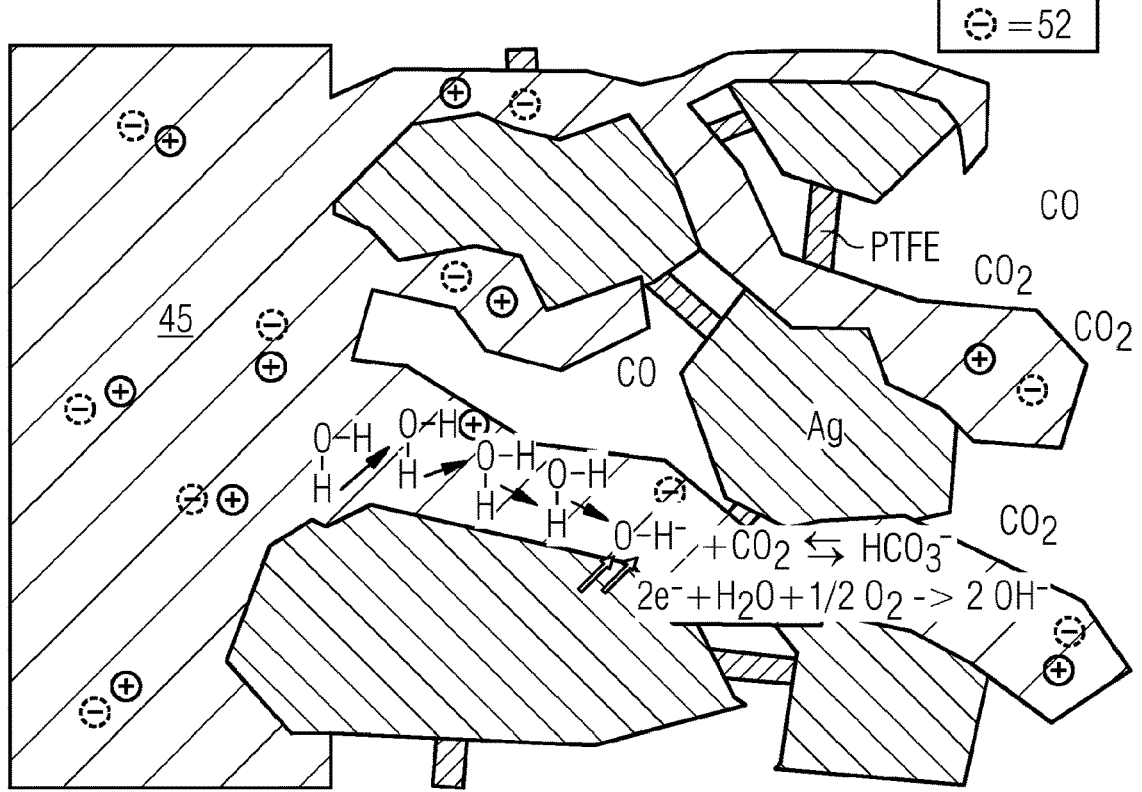

FIG. 26 shows, by way of example, the electrochemical reduction of $CO_2$ to CO with applied voltage with hydroxide transport by the Grotthus mechanism.

At higher temperature of, for example, 50° C. or more, e.g. >50° C., hydrogencarbonate formation starts to dominate.

$$CO_2 + OH^- \leftrightarrows HCO_3^-$$

The equilibrium is unfavorably toward the hydrogencarbonate side, which cannot be via tunneling processes, but has to be carried out of the electrode via true transport processes, as shown in FIG. 27, where the summary of the chemical equilibria in the illustrative gas diffusion electrode are shown. With the hydrogencarbonate, owing to the inward migration of cations, there can be deposition of salts in the GDE or at least formation of permeate on the side of the GDE remote from the electrolyte.

While hydroxide ions, supported by the applied field, can diffuse in a low-energy manner out of the GDE by virtue of the Grotthus tunnel effect, the hydrogencarbonate ions have to actively be conveyed out of the GDE against the high electrolyte concentration. The distances necessary for the purpose are typically in the region of several hundred micrometers. It is possible here for the anion transport material to have an assisting effect.

If the anion transport material is an anion exchanger, this can be introduced into the GDE with any anion. It can then, for example, either be exchanged for $OH^-$ or $HCO_3^-$ prior to the incorporation, or an exchange can proceed spontaneously during operation merely owing to the differences in concentration from the electrolyte.

FIG. 28 shows an illustrative GDE, which shows anion transport material 54 and catalyst, for example catalyst particles, e.g. Ag, with a binder present (PTFE here by way of example), provided in homogeneous distribution. The anion transport material includes a multitude of localized positive charges 55 that can be compensated for by counterions, e.g. $OH^-$ or $HCO_3^-$. This results in an anion pathway along which the anions can move. If an additional ion is formed by the electroreduction at any point in the GDE that is not compensated for at least in statu nascendi, this pushes an anion out at the phase boundary of the GDE by virtue of a hopping mechanism. This means that the $OH^-$ or $HCO_3^-$ formed is not the same as that which leaves the GDE. Along the pathway, it is therefore necessary to expend only the energy for the hopping, and it is not necessary to push the anion itself out of the GDE. As well as the Grotthus mechanism, therefore, an additional "hopping pathway" is generated. In addition, the positive charge of the anion transport resin, for example an anion exchange resin, prevents the inward diffusion of mobile positive cations 51 (e.g. potassium). FIG. 28 shows the anion transport in the GDE by way of example as follows in electrolysis operation. The electroreduction produces $^{new}HCO_3^-$. Owing to lack of charge compensation, this first changes place with $^3HCO_3^-$, then $^3HCO_3^-$ with $^2HCO_3^-$, and finally $^2HCO_3^-$ with $^1HCO_3^-$. Since $^1HCO_3^-$ is at the electrolyte boundary, it is transferred to the electrolyte, where its charge is balanced. In this way, the transport can be concluded.

The anion transport material, for example an anion exchange material, for example an anion exchange resin, can thus fulfill multiple functions:

It can provide a transport pathway, in addition to diffusion, for anions such as $HCO_3^-$.

In addition, it can act as blocker for mobile cations from the electrolyte owing to a coulombic blockade, where portions of the GDE may then be positively charged by the anion exchange material even though a negative potential is being applied.

When mobile cations are being blocked, it is also possible to suppress the deposition of salts in the GDE or suppress permeate through the GDE. Irrespective of the electrolyte, the permeate, for example in the case of $CO_2$ electrolysis, may be pure hydrogencarbonate—with charge compensation by the cation in the electrolyte.

In some embodiments, the ion transport material, for example ion exchange material, for example an ion exchange resin, for example an anion exchange material, comprises polar groups such as $R\!-\!O\!-\!R$, $RCOO^-$, $R\!-\!NR_3^+$, $R\!-\!NH_2$, $RPO_3^{2-}$, $ROH$, where R is any radical, for example an organic radical. The use of ion exchange resins with polar functionalities ($R\!-\!O\!-\!R$, $RCOO^-$, $R\!-\!NR_3^+$, $R\!-\!NH_2$, $RPO_3^{2-}$, $ROH$) increases the proportions of the hydrophilic regions of the electrode, which can increase electrolyte transport through the electrode. The dilution effect achieved can likewise counteract oversaturation or salt crystallization, but complete flooding should be avoided. In the preparation of gas diffusion electrodes with such ion transport materials, e.g. ion exchange materials, therefore, in particular embodiments, a multilayer construction, for example a 2-layer construction, is advantageous, in which at least one layer essentially does not include the ion exchange material, for example one which faces a gas in operation, for example is thus on a carrier, in which case no chemical reaction should preferably take place in this layer, which can be assured, for example, by an appropriate adjustment of the gas pressure and/or the supply of electrolyte in operation. It is additionally not ruled out that the resins used have $CO_2$-binding functionalities since $OH^-$ can react with $CO_2$ to give hydrogencarbonate.

In some embodiments, the ion exchange material, for example an anion exchange material, is stable at a pH of more than 7. In some embodiments, the ion exchange material, for example an anion exchange material, is stable in a strongly basic environment, for example at a pH of 9 or more, for example 10 or more. In some embodiments, the ion transport material, for example the ion exchange material, e.g., the anion exchange material, is present in an amount of 0.1% to 50% by weight, 0.1% to 40% by weight, 3% to 35% by weight, 5% to 30% by weight, or 10% to 25% by weight, based on the gas diffusion electrode and/or based on the layer, for example a catalyst layer, in which it is present.

A hydrophilic or predominantly hydrophilic (for example more hydrophilic than hydrophobic regions) ion transport material, for example ion exchange material, for example anion transport material, for example anion exchange material, for example anion exchange resin, may be present in an amount of 0.1% to 20% by weight, or 1% to 18% by weight, based on the gas diffusion electrode and/or based on the layer, for example a catalyst layer, in which it is present. The reason for such a "lower" upper limit is that customary anion exchange resins are produced for use in an aqueous environment and are therefore predominantly hydrophilic. If too much of these anion exchange resins is now included in the mixture, the GDE becomes so strongly hydrophilic that it can be fully penetrated by water and hence the function of a GDE can be lost.

Correspondingly, however, anion transport materials also include hydrophobic variants of "anion exchange resins" which typically cannot be used as such at all in aqueous media. For these, correspondingly, a higher amount is possible in the gas diffusion electrode, as specified above. When the anion transport material is sufficiently hydrophobic, it can also function simultaneously as binder, which is preferred. Correspondingly, in that case, the binder content can also be reduced.

In some embodiments, an amount of a hydrophilic or predominantly hydrophilic ion exchange material in a gas diffusion electrode of the invention is lower than an amount of hydrophobic binder, and/or at least one layer containing a greater amount of hydrophobic binder than of hydrophilic or predominantly hydrophilic ion exchange material is present.

Unwanted penetration with electrolyte can be obtained, for example, when an amount of hydrophilic or predominantly hydrophilic anion exchange resin is used that exceeds the amount of hydrophobic binder used across the GDE. For example, a ratio of more than 20% by weight of hydrophilic or predominantly hydrophilic resin to 7% by weight of PTFE was identified as problematic. Such high contents of exchange resin can be achieved, for example, within the catalyst layer in a two-layer GDE with an essentially hydrophobic base layer composed of, for example, >10% by weight of PTFE without attaining complete flooding.

In some embodiments, the ion transport material, e.g. the anion transport material, is added in the form of powder in the course of production, where the powder may have, for example, particles having a particle size of 0.1 to 100 μm, e.g. 1 to 50 μm, for example 1 to 20 μm or 1 to 10 μm, where the powder may also be macroporous, i.e. aggregated from the abovementioned particles. The particle size can be determined here, for example, by microscopy by means of image analysis, by laser diffraction and/or by dynamic light scattering.

In some embodiments, for impregnation with ion exchange material, the processes uses a microemulsion in which the ion exchange material may have particle sizes of 0.01 to 10 μm, for example 0.05 to 5 μm, for example 0.1 to 1 μm. The particle size can be determined here, for example, by microscopy by means of image analysis, by laser diffraction and/or by dynamic light scattering.

The ion transport material, for example ion exchange material, for example anion transport material, may include an ion transport polymer, for example including ion exchange polymers, wherein the polymer skeleton of the ion transport material, for example ion exchange material, for example anion transport material, for example anion exchange material, may optionally also have been partly or fully fluorinated. However, the polymer skeleton of the ion transport material, for example ion exchange material, for example anion transport material, for example anion exchange material, is not particularly restricted, and may, for example, be based on a polymer or copolymer based, for example, on styrene. The polymer skeleton may have been constructed, for example, from divinylbenzene-styrene copolymers that have functionalized side chains or have been functionalized directly.

Other possible polymer backbones of the ion transport material are of course, for example, ion transport polymers, hydrophobic polymer skeletons such as those based on PTFE (polytetrafluoroethylene), PVDF (polyvinylidene difluoride), PFA (perfluoroalkoxy polymers), FEP (fluorinated ethylene-propylene copolymers), PFSA (perfluorosulfonic acid polymers), and mixtures thereof, especially PTFE. In such a case, there is then primarily or even solely ion transport, since an electrolyte can no longer penetrate into the gas diffusion electrode, and the ion transport material in this case is no longer an ion exchange material.

The polymer backbone of the ion transport material, for example ion exchange material, for example the anion transport material, for example anion exchange material, can serve to adjust the hydrophilic/hydrophobic properties of the gas diffusion electrode. For adjustment of hydrophilicity, it is also possible to use hydrophilic materials such as polysulfones, e.g. polyphenyl sulfones, polyimides, polybenzoxazoles or polyether ketones, or generally polymers that are electrochemically stable in the electrolyte, for example including polymerized ionic liquids. For all polymer backbones mentioned, it is possible to insert suitable functional groups for ion transport, which are also described by way of example hereinafter, for example by replacing functional groups present therein with suitable leaving groups.

In some embodiments, the ion transport material, for example anion transport material, for example anion exchange material, for example ion exchange polymer, is an ion exchange resin, e.g. a nonpolar ion exchange resin, and/or at least one nonpolar ion exchange resin is used as ion exchange material in the GDE. The use of polar ion exchange resins in the catalyst layer leads to a noticeable increase in the hydrophilic properties of the gas diffusion electrode, and so the hydrophilicity overall can be adjusted.

In the case of use of polar ion transport materials in the GDE as cathode, this is in direct contact with an anion exchange membrane and/or an anion exchange diaphragm in an electrolysis cell, e.g. on the side directed toward the anode. All-active catalyst electrodes with just one layer having ionic conductivity may be used in direct contact with an anion exchange membrane and/or an anion exchange diaphragm. In some embodiments, no contact is envisaged here with a membrane and/or a diaphragm, i.e. a gap.

The ion transport material, for example ion exchange material, for example the anion transport material, for example an ion exchange polymer or anion exchange resin, may comprise various functional groups for ion exchange that may be the same or different, for example tertiary amine groups, alkylammonium groups and/or phosphonium groups. In some embodiments, the ion transport material, for example the anion exchange material, has quaternary alkylammonium groups. The alkyl radicals in the alkylammonium groups are not particularly restricted here and may, for example, be substituted and/or unsubstituted, linear and/or branched alkyl radicals having 1 to 40 carbon atoms, for example 1 to 20 carbon atoms, for example substituted or unsubstituted methyl, ethyl, propyl, isopropyl, butyl, isobutyl, tert-butyl radicals, etc., especially methyl radicals. Suitable substituents are, for example, F and Cl, preferably F; OH, etc., preferably OH and/or F. In some embodiments, the ion exchange material, for example the anion exchange material, has quaternary alkylammonium groups, preferably unsubstituted tetraalkyl-ammonium groups, especially tetramethylammonium groups, and/or dialkylethanolammonium groups in which the alkyl groups are unsubstituted, e.g. dimethylethanolammonium groups. In some embodiments, the ion exchange material, for example the anion exchange material, does not comprise any trialkylethanol groups.

In some embodiments, the ion transport material, for example ion exchange material, does not have any imidazolium, pyridinium and/or β-hydrogen-containing groups since chemical stability under electrolysis conditions can be inadequate. Examples of suitable ion transport polymers, for example ion exchange polymers, specifically for the electrochemical reduction of $CO_2$, include basic or strongly basic ion exchange resins of type I (with tetraalkylammonium groups) and/or type II (with dimethylethanolammonium groups). Commercially available and suitable anion exchange materials are shown by way of example in table 2 below.

TABLE 2

| Examples of suitable commercially available anion exchange resins | | | |
|---|---|---|---|
| Exchange resin | Resin type | Matrix | Functional group |
| DOWEX Monosphere 550A | strongly basic | styrene DVB GEL | tetraalkylammonium |
| DOWEX Monosphere 700A | strongly basic | styrene DVB GEL | tetraalkylammonium |
| DOWEX Monosphere MP-725A | strongly basic | styrene DVB macroporous | tetraalkylammonium |
| DOWEX SBR-C | strongly basic | styrene DVB | tetraalkylammonium |
| DOWEX SBR-LC NG | strongly basic | styrene DVB | tetraalkylammonium |
| Lewatit Monoplus M500 | strongly basic | styrene DVB GEL | tetraalkylammonium |
| Lewatit Monoplus Mp500 | strongly basic | styrene DVB macroporous | tetraalkylammonium |
| Lewatit Monoplus Mp500 OH | strongly basic | styrene DVB macroporous | tetraalkylammonium |
| Lewatit Monoplus Mp500 KR | strongly basic | styrene DVB macroporous | tetraalkylammonium |
| Lewatit Monoplus M 500 MB | strongly basic | styrene DVB macroporous | tetraalkylammonium |
| Lewatit Monoplus M 500 KR | strongly basic | styrene DVB GEL | tetraalkylammonium |
| Lewatit Monoplus Mp600 | strongly basic | styrene DVB macroporous | dimethylethanolammonium |
| Lewatit Monoplus Mp64 | weakly basic | styrene DVB | tertiary amine |
| Lewatit Monoplus Mp62 | weakly basic | styrene DVB | tertiary amine |
| Lewatit Monoplus Mp62 WS | weakly basic | styrene DVB macroporous | tertiary amine |
| Lewatit Monoplus SR 7 | strongly basic | polystyrene | tetraalkylammonium |
| Lewatit Monoplus M800 | strongly basic | styrene DVB macroporous | tetraalkylammonium |
| Lewatit Monoplus M800 OH | strongly basic | styrene DVB GEL | tetraalkylammonium |
| Lewatit Monoplus M800 KR I | strongly basic | styrene DVB macroporous | tetraalkylammonium |
| Lewatit Monoplus MDS 4368 | moderately basic | styrene DVB macroporous | tertiary amine, tetraalkylammonium |
| Lewatit K1000 USO4 | strongly basic | styrene DVB macroporous | tetraalkylammonium |
| Amberlite IRA410 CL | strongly basic | styrene DVB GEL | dimethylethanolammonium |
| Amberlite IRA400 CL | strongly basic | styrene DVB macroporous | trimethylammonium |
| Amberlite IRA900 | strongly basic | styrene DVB macroporous | trimethylammonium |
| Amberlite IRA402 Cl | strongly basic | styrene DVB macroporous | trimethylammonium |

As well as the anion exchange resins, it is also possible to use ionomers as anion transport material, for example anion exchange material, which can be used, for example, in the form of a dispersion in the course of production. The ionomers may also be based here, in particular embodiments, on quaternary ammonium functionalities. Known ionomers are obtainable here, for example, from Tokuyama, AS 4, which is likewise based on quaternary ammonium functionalities. The ionomers here have, for example, a lower molecular weight than the resins, but are essentially chemically similar. By virtue of the lower molecular weight, the ionomers that are thus species of lower molecular weight are typically also more readily soluble than the corresponding resins.

In some embodiments, the ion transport material, especially the anion transport material, for example an anion exchange material such as an anion exchange resin, has been at least partly fluorinated. In some embodiments, the ion exchange material, especially the anion exchange material, has side chains that have been fluorinated, have been at least partly fluorinated, for example fully fluorinated.

In some embodiments, the ion transport material, especially the anion transport material, also has OH groups and/or $NH_2$ groups. The ion transport material, for example an ion exchange resin, may itself be co-catalytically active as a result, in that $CO_2$ is actively bound by R—$NH_2$ or R—OH functions.

In some embodiments, the ion transport material, e.g. the anion transport material, is chemically unchanged in the preparation process, for example by the mixing process and/or the presence of the metal M, for example as catalyst. But it can be mechanically deformed, for example, for example to fibers.

The electrodes described in the present disclosure may comprise a gas diffusion electrode. The gas diffusion electrode here is not particularly restricted with regard to its configuration, provided that, as in the case of gas diffusion electrodes, it is typically possible for three states of matter—solid, liquid and gaseous—to be in contact with one another and that the solid matter of the electrode has at least one electron-conducting catalyst capable of catalyzing an electrochemical reaction between the liquid phase and the gaseous phase. The gas diffusion electrodes may be operated here either in a flow-by or in a flow-through configuration, meaning that a gas flows past or through them, but preferably past them. It is also not impossible that a gas diffusion electrode is not entirely porous, but has only structuring at the surface through which a gas can diffuse, for example micro- and/or nanostructuring.

In some embodiments, hydrophobic channels and/or pores or regions and optionally hydrophilic channels and/or pores or regions are present in the gas diffusion electrode (GDE) on the electrolyte side, where catalyst sites may be present in the hydrophilic regions. On one gas side of the gas diffusion electrode, this may comprise hydrophobic channels and/or pores. In this respect, the gas diffusion electrode may comprise at least two sides, one with hydrophilic and optionally hydrophobic regions and one with hydrophobic regions.

Particularly active catalyst sites in a GDE lie in the liquid/solid/gaseous three-phase region. An ideal GDE thus has maximum penetration of the bulk material with hydrophilic and hydrophobic channels and/or pores in order to obtain a maximum number of three-phase regions for active catalyst sites.

In some embodiments, the electrode, e.g. as a gas diffusion electrode, comprises or consists of metal M, the ion transport material, e.g. anion transport material, and the binder.

Figure 7:
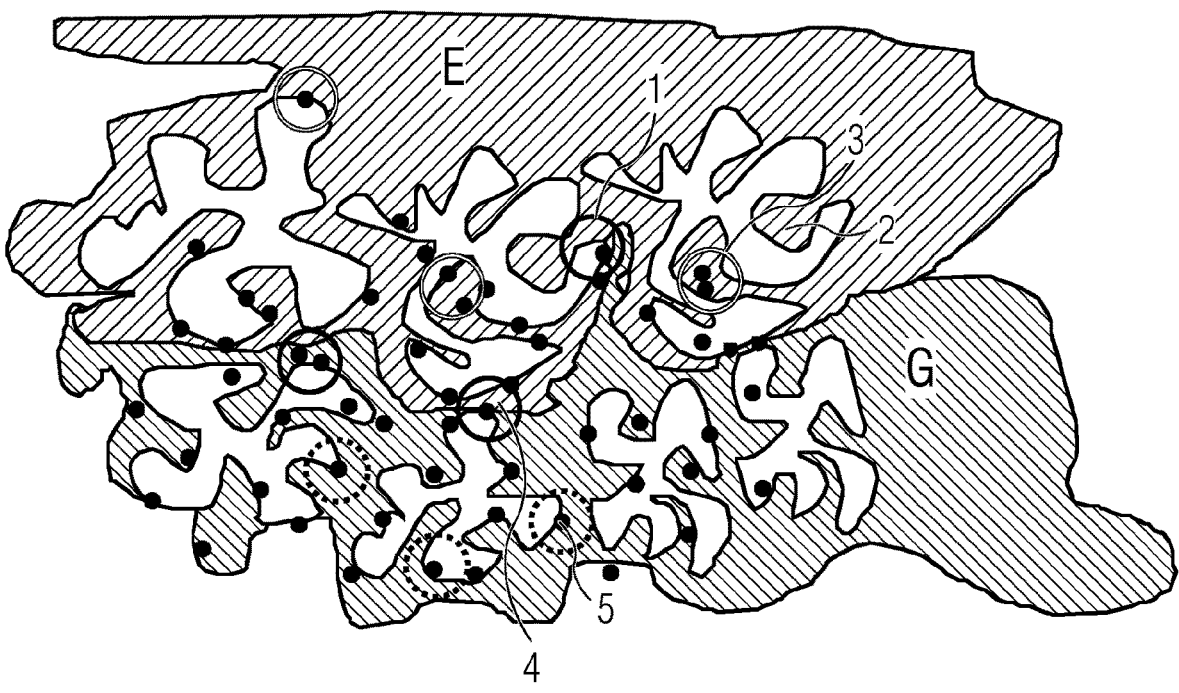
FIG. 7 shows a schematic diagram of an example embodiment of a gas diffusion electrode incorporating teachings of the present disclosure.

FIG. 7 illustrates the relationships between hydrophilic and hydrophobic regions in an illustrative GDE having two layers that can achieve a good liquid/solid/gaseous three-phase relationship. In this case, for example, there are hydrophobic channels or regions 1 and hydrophilic channels or regions 2 on the electrolyte side E in the electrode, where catalyst sites 3 of low activity may be present in the hydrophilic regions 2 and can be provided by the compound of the metal M. In addition, there are inactive catalyst sites 5 on the side of the gas G that have no access to the electrolyte. Particularly active catalyst sites 4 are in the liquid/solid/gaseous three-phase region. An ideal GDE can thus have maximum penetration of the bulk material with hydrophilic and hydrophobic channels in order to obtain a maximum number of three-phase regions for active catalyst sites.

However, the teachings herein also include gas diffusion electrodes having just one layer, in which the gas diffusion electrode comprises the metal M, the at least one binder and the at least one ion transport material, e.g. anion transport material. In such a single-layer embodiment, it is then possible for the hydrophilic and hydrophobic regions, for example pores and/or channels, also to be present in the one layer, such that predominantly hydrophilic and predominantly hydrophobic regions can be established in the layer. The elucidation of the catalyst sites here is then analogous to the two-layer construction described by way of example. The ion transport material may be present in both layers.

In some embodiments, by virtue of an anion transport material, there may be transport of anions, typically generated in the GDE, away from the gas side and in the electrolyte direction, while the anion transport material also prevents the cations of the electrolyte from penetrating into the GDE. In some embodiments, the gas diffusion electrode has pores and/or channels having a diameter of 10 nm to 100 $\mu$m, or of 50 nm to 50 $\mu$m, or of 100 nm to 10 $\mu$m, which can be determined, for example, by scanning electron microscopy, optionally after prior slicing of the GDE. The catalyst of the present GDE comprising the metal M and cations thereof, e.g. $M^+$ and/or $M^{2+}$ (the latter especially for Pd and/or Cu), may also have dendritic structures with a fine structure, for example a distance between two dendrites, with a size of 1 to 100 nm, 2 to 20 nm, or 3 to 10 nm.

In some embodiments, as well as the metal M and the ion transport material and the binder, the electrode may also comprise further constituents, for example a substrate or a carrier to which the metal M, the at least one binder and optionally the ion transport material, for example the anion transport material, may be applied. In the case of multilayer gas diffusion electrodes, however, it may also be the case that a first layer is applied to the carrier that does not include any ion transport material, e.g. anion transport material, in which case the ion transport material, e.g. the anion transport material, may be present in a second, third, etc. layer.

The carrier here is not particularly restricted and may comprise, for example, a metal such as silver, platinum, nickel, lead, titanium, nickel, iron, manganese, copper or chromium or alloys thereof, such as stainless steels, and/or at least one nonmetal such as carbon, Si, boron nitride (BN), boron-doped diamond, etc., and/or at least one conductive oxide such as indium tin oxide (ITO), aluminum zinc oxide (AZO) or fluorinated tin oxide (FTO)—for example for production of photoelectrodes, and/or at least one polymer based on polyacetylene, polyethoxythiophene, polyaniline or polypyrrole, as, for example, in polymer-based electrodes. Nonconductive carriers, for example polymer meshes, are possible, for example given adequate conductivity of the catalyst layer. Given adequate conductivity greater than 0.01 m/ohm·mm$^2$ and correspondingly resolved reverse-side contacting of the electrode, for example by an expanded titanium metal mesh, polymeric carriers or meshes are also possible.

In some embodiments, the carrier may, however, be formed by the metal M, optionally with at least one binder. An example carrier, in particular embodiments, is a mesh having a mesh size w of 0.3 mm<w<2.0 mm, 0.5 mm<w<1.4 mm, and a wire diameter x of 0.05 mm<x<0.5 mm, or 0.1 mm≤x≤0.25 mm.

In some embodiments, the first layer may also contain further promoters which, in interaction with the metal M, improve the catalytic activity of the GDE. In some embodiments, the first layer contains at least one metal oxide that may have a lower reduction potential than the evolution of ethylene, $ZrO_2$, $Al_2O_3$, $CeO_2$, $Ce_2O_3$, $ZnO_2$, MgO; and/or at least one metal-rich (based on M), for example copper-rich and/or silver-rich, intermetallic phase, for example a Cu-rich phase selected from the group of the binary Cu—Al, Cu—Zr, Cu—Y, Cu—Hf, Cu—Ce, Cu—Mg systems and the ternary Cu—Y—Al, Cu—Hf—Al, Cu—Zr—Al, Cu—Al—Mg, Cu—Al—Ce systems with Cu contents >60 at %, and/or a corresponding Ag-rich phase such as Ag—Al, Ag—Zr, Ag—Y, Ag—Hf, Ag—Ce, Ag—Mg, Ag—Y—Al, Ag—Hf—Al, Ag—Zr—Al, Ag—Al—Mg, Ag—Al—Ce with Ag contents <60 at %; and/or metal M-containing, for example silver-containing and/or copper-containing, perovskites and/or defect perovskites and/or perovskite-related compounds, for example $YBa_2Cu_3O_{7-\delta}$, $YBa_2Ag_3O_{7-\delta}$ where $0 \le \delta \le 1$ (corresponding to $YBa_2Cu_3O_{7-\delta}X_o$), $CaCu_3Ti_4O_{12}$, $La_{1.85}Sr_{0.15}CuO_{3.930}Cl_{0.053}$, $(La, Sr)_2CuO_4$, $AgTaO_3$ or lithium-modified $Ag_{1-x}Li_xNbO_3$, etc.

Suitable promoters are also compounds of the metal M that have a solubility in water at 25° C. and standard pressure of less than 0.1 mol/L, of less than 0.05 mol/L, of less than 0.01 mol/L, of less than 0.0001 mol/L, or of less than $1*10^{-10}$ mol/L, for example of less than $1*10^{-20}$ mol/L. Such solubilities of compounds of the metal M can be taken, for example, from product data sheets and/or determined in a simple manner by simple experiments, for example placing of a solid amount of the compound of the metal M in a particular volume of water, for example distilled, bidistilled or triply distilled water, at 25° C. and standard pressure and measuring the concentration of ions released from the compound over time until attainment of an approximately constant value, and are consequently readily available to the person skilled in the art.

The compound of the metal M that has a solubility in water at 25° C. and standard pressure of less than 0.1 mol/L may have a formula selected from $M_{1-x}X$, $M_{2-y}Y$, $M_{2-y}Y'_w$ and $M_{3-z}Z$, where $0 \le x \le 0.5$; $0 \le y \le 1$; $0 \le z \le 1.5$; $0 \le x \le 0.4$; $0 \le y \le 0.8$; $0 \le z \le 1.2$; or $0 \le x \le 0.3$; $0 \le y \le 0.6$; $0 \le z \le 0.9$; X is selected from Cl, Br, $Br_3$, I, $I_3$, $P_3$, $As_3$, $As_5$, $As_7$, $Sb_3$, $Sb_5$, $Sb_7$, and mixtures thereof, e.g. Cl, Br, $Br_3$, I, $I_3$, $P_3$, and mixtures thereof; Y is selected from S, Se, Te and mixtures thereof; Y' is selected from S, Se, Te and mixtures thereof, e.g. S, Se and mixtures thereof, e.g. S, Se; $w \ge 2$, preferably $w \le 10$, e.g. $w \le 5$; and Z is selected from P, As, Sb, Bi, $P_3$, $As_3$, $As_5$, $As_7$, $Sb_3$, $Sb_5$, $Sb_7$, and mixtures thereof, e.g. P, As, Sb, Bi, and mixtures thereof; and/or is selected from molybdates, tungstates, selenates, arsenates, vanadates, chromates, manganates, niobates of the metal M and thio and/or seleno derivatives of molybdates, tungstates, selenates, arsenates, vanadates, chromates, manganates, niobates of the metal M; and/or compounds of the formula $M_aX_bY_cZ_d$ where $a \ge 2$, e.g. $a \ge 3$; $0 \le b \le 4$, e.g. $0 \le b \le 3$, e.g. $0 \le b \le 2$, e.g. $0 \le b \le 1$; $0 \le c \le 8$, e.g. $0 \le c \le 6$, e.g. $0 \le c \le 5$, e.g. $0 \le c \le 4$, e.g. $0 \le c \le 3$, e.g. $0 \le c \le 2$, e.g. $0 \le c \le 1$; $0 \le d \le 4$, e.g. $0 \le d \le 3$, e.g. $0 \le d \le 2$, e.g. $0 \le d \le 1$; X is selected from Cl, Br, $Br_3$, I, $I_3$, $P_3$, $As_3$, $As_5$, $As_7$, $Sb_3$, $Sb_5$, $Sb_7$, and mixtures thereof, e.g. Cl, Br, $Br_3$, I, $I_3$, $P_3$, and mixtures thereof; Y is selected from S, Se, Te and mixtures thereof; and Z is selected from P, As, Sb, Bi, $P_3$, $As_3$, $As_5$, $As_7$, $Sb_3$, $Sb_5$, $Sb_7$, and mixtures thereof, where at least two of b and c are not simultaneously 0.

The compound of the metal M that has a solubility in water at 25° C. and standard pressure of less than 0.1 mol/L thus need not be stoichiometric here either and may also have mixed phases. Also included are ternary, quaternary etc. compounds, for example $Ag_3SbS_3$, pyrargyrite, and $Ag_3AsS_3$, xanthoconite.

In some embodiments, the compound of the metal M that has a solubility in water at 25° C. and standard pressure of less than 0.1 mol/L is a compound of the formula Ia: $M_{1-x}X$ where $0 \le x \le 0.5$; $0 \le x \le 0.4$; $0 \le x \le 0.3$, and X is selected from Cl, Br, $Br_3$, I, $I_3$, $P_3$, $As_3$, $As_5$, $As_7$, $Sb_3$, $Sb_5$, $Sb_7$, and mixtures thereof, e.g. Cl, Br, $Br_3$, I, $I_3$, $P_3$, and mixtures thereof, for example including mixtures of Cl, Br, I, for example a compound of the formula I'a: $Ag_{1-x}X$ with X=F, Cl, Br, $Br_3$, I, $I_3$, $P_3$, $As_3$, $As_5$, $As_7$, $Sb_3$, $Sb_5$, $Sb_7$, or a mixture thereof, e.g. X=F, Cl, Br, $Br_3$, I, $I_3$, $P_3$, or a mixture thereof, e.g. a mixture of Cl, Br and/or I. Particularly some of the latter compounds of silver are photosensitive. For operation, however, this is usually immaterial since the electrodes in the electrolyzer are not exposed to daylight. Substoichiometric compounds with $0 < x \le 0.5$; $0 < x \le 0.4$; or $0 < x \le 0.3$; e.g. $0 < x \le 0.2$; $0 < x \le 0.1$ are likewise suitable. In some embodiments, x=0. Examples of the compound Ia are, for example, AgCl, AgBr, AgI, $AgP_3$, CuCl, CuBr, CuI, AuCl, AuBr, AuI.

In some embodiments, the compound of the metal M that has a solubility in water at 25° C. and standard pressure of less than 0.1 mol/L is a chalcogen-based compound of the formula Ib: $M_{2-y}Y$, or I*: $M_{2-y}Y'$, where $0 \le y \le 1$; $0 \le y \le 0.8$; or $0 \le y \le 0.6$; Y is selected from S, Se, Te and mixtures thereof; Y' is selected from S, Se, Te and mixtures thereof, e.g. S, Se and mixtures thereof, e.g. S, Se; and $w \ge 2$, or $w \le 10$, e.g. $w \le 5$, e.g. a compound of the formula I'b: $Ag_{2-y}Y$ or I*'b: $Ag_{2-y}Y'_w$ with Y=S, Se, Te or a mixture thereof; Y'=S, Se, Te or a mixture thereof, e.g. S, Se or a mixture thereof, e.g. S, Se; $w \ge 2$, or $w \le 10$, e.g. $w \le 5$. In some embodiments, this includes the polymeric or oligomeric anions of sulfur or selenium $Y'_w{}^{2-}$. Some of these compounds are semiconductive, such that the electrical coupling to the silver catalyst can be assured. Substoichiometric compounds with $0 < y \le 1$; $0 < y \le 0.8$; or $0 < y \le 0.6$; e.g. $0 < x \le 0.4$; $0 < x \le 0.2$; $0 < x \le 0.1$ are likewise suitable. In some embodiments, y=0. Examples of the compound of the formula Ib are, for example, $Ag_2S$, $Ag_2Se$, $Ag_2Te$, $Cu_2S$, $Cu_2Se$, $Cu_2Te$, $Au_2S$, and examples of the compound of the formula I'b are, for example, $Ag_2$ $(S_2)$, $Ag_2(Se_2)$, $Cu_2(S_2)$, $Cu_2(Se_2)$, etc.

In some embodiments, the compound of the metal M that has a solubility in water at 25° C. and standard pressure of less than 0.1 mol/L is a compound of the formula Ic: $M_{3-z}Z$ where $0 \le z \le 1.5$; $0 \le z \le 1.2$; or $0 \le z \le 0.9$; and Z is selected from P, As, Sb, Bi, $P_3$, $As_3$, $As_5$, $As_7$, $Sb_3$, $Sb_5$, $Sb_7$, and mixtures thereof, e.g. a compound of the formula I'c: $Ag_{3-z}Z$ with Z=P, As, Sb, Bi, $P_3$, $As_3$, $As_5$, $As_7$, $Sb_3$, $Sb_5$, $Sb_7$, or a mixture thereof. Some of these compounds are semiconductive or metallically conductive, such that the electrical coupling to the silver catalyst can be assured. Substoichiometric compounds with $0 < z \le 1.5$; $0 < z \le 1.2$; or $0 < z \le 0.9$; e.g. $0 < x \le 0.6$; $0 < x \le 0.4$; $0 < x \le 0.2$; $0 < x \le 0.1$ are likewise suitable. In some embodiments, z=0. Examples of the compound of the formula Ic are, for example, $Ag_3P$, $Ag_3As$, $Ag_3Sb$, $Ag_3Bi$, $Cu_3P$, $Cu_3As$, $Cu_3Sb$, $Cu_3Bi$.

In some embodiments, compounds of the metal M have a solubility in water at 25° C. and standard pressure of less than 0.1 mol/L with heavy anions such as molybdate, tungstate, arsenate, selenate, vanadate, chromate, manganate in various oxidation states, niobate or thio and/or seleno derivatives thereof. These anions may also be in polymeric form in the form of polyoxometalates. These may then be used primarily in the form of their silver salts. Likewise encompassed are mineral compounds of the metal M, for example of the formula $M_aX_bY_cZ_d$ where $a \ge 2$, e.g. $a \ge 3$; $0 \le b \le 4$, e.g. $0 \le b \le 3$, e.g. $0 \le b \le 2$, e.g. $0 \le b \le 1$; $0 \le c \le 8$, e.g. $0 \le c \le 6$, e.g. $0 \le c \le 5$, e.g. $0 \le c \le 4$, e.g. $0 \le c \le 3$, e.g. $0 \le c \le 2$, e.g. $0 \le c \le 1$; $0 \le d \le 4$, e.g. $0 \le d \le 3$, e.g. $0 \le d \le 2$, e.g. $0 \le d \le 1$; X is selected from Cl, Br, $Br_3$, I, $I_3$, $P_3$, $As_3$, $As_5$, $As_7$, $Sb_3$, $Sb_5$, $Sb_7$, and mixtures thereof, e.g. Cl, Br, $Br_3$, I, $I_3$, $P_3$, and mixtures thereof; Y is selected from S, Se, Te and mixtures thereof; and Z is selected from P, As, Sb, Bi, $P_3$, $As_3$, $As_5$, $As_7$, $Sb_3$, $Sb_5$, $Sb_7$, and mixtures thereof, e.g. P, As, Sb, Bi, and mixtures thereof, where at least two of b and c are not simultaneously 0, e.g. $Ag_3SbS_3$, pyrargyrite, and $Ag_3AsS_3$, xanthoconite.

The compounds of the metal M that have a solubility in water at 25° C. and standard pressure of less than 0.1 mol/L that are mentioned in the context of the present disclosure may occur in different polymorphs that may differ in terms of their crystal structure. As well as the compounds described, for example, also known are the following ternary compounds: $Ag_3SbS_3$, pyrargyrite, $Ag_3AsS_3$, xanthoconite, which may be used in gas diffusion electrodes of the invention.

In some embodiments, promoters here are metal oxides and/or compounds of the metal M that have a solubility in water at 25° C. and standard pressure of less than 0.1 mol/L.

The metal oxide used and/or the compound of the metal M that has a solubility in water at 25° C. and standard pressure of less than 0.1 mol/L is water-insoluble, in order that aqueous electrolytes can be used in an electrolysis using the gas diffusion electrode. Moreover, because the redox potential of the metal oxide is lower than that of the evolution of ethylene, it can be ensured that ethylene can be produced from $CO_2$ by means of the GDE. The oxides, in particular embodiments, are not to be reduced in a carbon dioxide reduction either. Nickel and iron, for example, are unsuitable since hydrogen forms here. Moreover, the metal oxides may be not inert, but constitute hydrophilic reaction sites that can serve for the provision of protons.

The promoters, especially the metal oxide and/or the compound of the metal M that has a solubility in water at 25° C. and standard pressure of less than 0.1 mol/L, in this context, may promote the function and production of electrocatalysts having long-term stability in that they stabilize catalytically active metal (M) nanostructures, for example of Cu and/or Ag. The structural promoters here may reduce the high surface mobilities of the nanostructures and hence their tendency to sinter.

Promoters used for the electrochemical reduction of $CO_2$ may include the following metal oxides that cannot be reduced to metals within the electrochemical window: $ZrO_2$ (E=–2.3 V), $Al_2O_3$ (E=–2.4 V), $CeO_2$ (E=–2.3 V), MgO (E=–2.5). It should be noted here that the oxides mentioned are not added as additives but are part of the catalyst itself. As well as its function as a promoter, the oxide also fulfills the feature of stabilizing the metal M, e.g. Cu and/or Ag, in the I oxidation state and additionally also intermediates in carbon dioxide reduction such as CO, $C_2H_4$(or OH).

Some embodiments include metal oxide-metal M catalyst structures that are produced as follows, using metal oxides of the metal M in the course of production. For the preparation of metal oxides of the metal M, the precipitation can be effected not as frequently described in a pH regime between pH=5.5-6.5 but in a range between 8.0-8.5. Likewise suitable are layered double hydroxides (LDHs) having a composition $[M^{z+}_{1-x}M^{3+}_{x}(OH)_2]^{q+}(X^{n-})_{q/n}\cdot yH_2O$ where $M^{1+}$=$Ag^+$, $Li^+$, $Na^+$, $K^+$, $M^{2+}$=$Ca^{2+}$, $Mg^{2+}$, $Cu^{2+}$, and $M^{3+}$=Al, Y, Ti, Hf, Ga. The corresponding precursors can be precipitated in a pH-controlled manner by co-metering of a metal salt solution and a basic carbonate solution. A particular feature of these materials is the presence of particularly fine metal M crystallites having a size of 4-10 nm, which can be structurally stabilized by an oxide of the metal M which is present.

It is possible to achieve the following effects: the metal oxide can lead to better distribution of the catalyst metal M owing to its high specific surface area; highly dispersed metal sites can be stabilized by the metal oxide; a gas, e.g. $CO_2$, chemisorption can be improved by the metal oxide; metal oxides of the metal M, e.g. Cu, Ag, can be stabilized.

The precipitation may be followed by a drying operation with subsequent calcination in an $O_2$/Ar gas stream. The oxide precursors produced, according to the method, can also be reduced thereafter directly in an $H_2$/Ar gas stream. The activation step can also be effected subsequently by electrochemical means. In order to improve the electrical conductivity of the layer applied prior to the electrochemical activation, it is also possible to some degree to mix oxide precursors and activated precursors. Some embodiments include subjecting the ready-calendered electrode to a subsequent calcination/thermal treatment before the electrochemical activation is conducted.

A further preparation option for suitable electrocatalysts is based on the approach of the production of intermetallic phases that are rich in metal M, for example $Cu_5Zr$, $Cu_{10}Zr_7$, $Cu_{51}Zr_{14}$, $Ag_5Zr$, $Ag_{10}Zr_7$, $Ag_{51}Zr_{14}$, which can be produced from the melt. Corresponding ingots can be ground subsequently and calcined fully or partly in an $O_2$/Ar gas stream and converted to the oxide form. Illustrative phases that are rich in metal M are binary Cu—Al, Cu—Zr, Cu—Y, Cu—Hf, Cu—Ce, Cu—Mg systems and corresponding ternary systems having contents of metal M>60 at %: CuYAl, CuHfAl, CuZrAl, CuAlMg, CuAlCe and/or corresponding Ag-rich phases such as Ag—Al, Ag—Zr, Ag—Y, Ag—Hf, Ag—Ce, Ag—Mg, Ag—Y—Al, Ag—Hf—Al, Ag—Zr—Al, Ag—Al—Mg, Ag—Al—Ce having Ag contents <60 at %. Copper-rich phases are known, for example, from E. Kneller, Y. Khan, U. Gorres, The Alloy System Copper-Zirconium, Part I. Phase Diagram and Structural Relations, Zeitschrift fir Metallkunde 77 (1), p. 43-48, 1986 for Cu—Zr phases, from Braunovic, M.; Konchits, V. V.; Myshkin, N. K.: Electrical contacts, fundamentals, applications and technology; CRC Press 2007 for Cu—Al phases, from Petzoldt, F.; Bergmann, J. P.; Schtrer, R.; Schneider, 2013, 67 Metall, 504-507 for Cu—Al phases, from Landolt-Börnstein—Group IV Physical Chemistry Volume 5d, 1994, p. 1-8 for Cu—Ga phases, and from P. R. Subramanian, D. E. Laughlin, Bulletin of Alloy Phase Diagrams, 1988, 9, 1, 51-56 for Cu—Hf phases, to which reference is hereby made with regard to these phases, and the content of which at least in this regard is hereby incorporated into this application by reference.

The proportion of metal M, e.g. Cu, Ag, may be greater than 40 at %, greater than 50 at %, or greater than 60 at %. In some embodiments, the intermetallic phases also contain nonmetal elements such as oxygen, nitrogen, sulfur, selenium and/or phosphorus, meaning that, for example, oxides, sulfides, selenides, nitrides, and/or phosphides, arsenides, antimonides, bismuthides are present. In some embodiments, the intermetallic phases have been partly oxidized.

In some embodiments, the following copper-containing perovskite structures and/or defect perovskites and/or perovskite-related compounds may be used for electrocatalysts, especially for the formation of CO or hydrocarbons: $YBa_2Cu_3O_{7-\delta}$ where $0\leq\delta\leq1$, $CaCu_3Ti_4O_{12}$, $La_{1.85}Sr_{0.15}CuO_{3.930}Cl_{0.053}$, $(La, Sr)_2CuO_4$, $AgTaO_3$ or lithium-modified $Ag_{1-x}Li_xNbO_3$. In some embodiments, mixtures of these materials may be used for electrode preparation, or, if required, that subsequent calcination or activation steps are conducted. With regard to promoters and suitable metals M or metal oxides and their structures, reference is hereby also made to DE 102015203245.0 or DE 102015215309.6, the content of which at least in this regard is hereby incorporated into this application by reference.

In some embodiments, particularly active and CO- or $C_2H_4$-selective gas diffusion electrodes for a $CO_2$ and/or CO electrolysis may fulfill a multitude of parameters for selective product formation.

The following specific parameters and requirements for a hydrocarbon-selective gas diffusion electrode have been found to be helpful:

Accessibility of the catalyst particles with reactant gas, e.g. $CO_2$ and/or CO, via predominantly hydrophobic pores Predominantly hydrophilic regions that enable contact between electrolyte and catalyst particles Sufficiently high electrical conductivity of the electrode or of the catalyst and a homogeneous potential distribution over the entire electrode area (potential-dependent product selectivity)

High chemical and mechanical stability in electrolysis operation (suppression of cracking and corrosion)

Defined porosity with a suitable ratio between hydrophilic and hydrophobic channels or pores in the immediately adjacent area (assurance of $CO_2$ availability with simultaneous presence of $H^+$ ions)

In some embodiments, all particles present may be part of the three-phase boundary in order to be able to achieve high current densities. Especially for copper, the pore system may have sufficient absorption of intermediates in order to assure further reaction or dimerization/oligomerization. Furthermore, for the electrocatalyst composed of the metal M and a cationic form thereof, e.g. $M^+$, for an electrochemical reduction, especially of $CO_2$ to give ethylene, the following properties may be helpful:

Uniform particle size with high specific surface area

Dendritic morphology, no isolated centers or clusters

The metal M, e.g. Ag, Cu, should not be in a purely cubic face-centered lattice but should have structural defects The presence of a monovalent oxide, e.g. $Cu_2O$ for Cu, $Ag_2O$ for Ag, of the metal M (or PdO for Pd) may improve ethylene selectivity; the formation of higher-valency oxides should advantageously be avoided High purity without extraneous metal traces of transition metals, and carbon constituents (carbon blacks, charcoal)

For stabilization of structural defects it is possible to use electrochemically stable oxides High selectivity and long-term stability Low overvoltage with respect to the gas reduction, e.g. $CO_2$ reduction For CO or hydrocarbon-selective gas diffusion electrodes, in the case of reduction of $CO_2$ and/or CO, accordingly, more intrinsic properties are needed than are offered by known systems. The electrocatalyst and the electrode are accordingly in close interplay. In some embodiments, the gas diffusion electrode comprises a carrier, e.g. in the form of a sheetlike structure, and a layer comprising the metal M, the ion transport material and at least one binder, wherein the layer comprises hydrophilic and hydrophobic pores and/or channels, wherein the proportion by weight of the ion transport material in the layer is preferably greater than the proportion by weight of the binder.

In some embodiments, the gas diffusion electrode of the invention comprises a carrier, preferably in the form of a sheetlike structure, a first layer comprising the metal M, the ion exchange material and optionally at least one binder, wherein the first layer comprises hydrophilic and optionally hydrophobic pores and/or channels, and also comprising a second layer comprising the metal M and at least one binder, wherein the second layer is present atop the carrier and the first layer atop the second layer, wherein the binder content in the first layer is less than in the second layer, wherein the second layer comprises hydrophobic pores and/or channels, wherein the second layer includes 3-30% by weight of binder, or 4-28% by weight of binder, or 5-20% by weight, e.g. 10-20% by weight of binder, based on the second layer, and the first layer may include 0-20% by weight of binder, or 0.1-15% by weight of binder, or 1-12% by weight of binder, or 5-10% by weight of binder (e.g. PTFE), and/or 0.1-40% by weight of ion transport material, 1-35% by weight of ion transport material, or 3-30% by weight of ion transport material, e.g. 10-25% by weight of ion transport material, based on the first layer. In the first and second layers, the proportion of metal M, binder and ion transport material may add up to 100% by weight in each case. It is not impossible here that the second layer contains an ion transport material, but the second layer facing the gas side may not contain any ion transport material, e.g. anion transport material.

In some embodiments, the electrolysis cell further comprises an anode and at least one membrane and/or at least one diaphragm between the cathode and anode, for example at least one anion exchange membrane. The further constituents of the electrolysis cell, for instance the anode, optionally a membrane and/or a diaphragm, feed(s) and drain(s), the voltage source, etc., and further optional devices such as cooling or heating units are not particularly restricted, nor are anolytes and/or catholytes that are used in such an electrolysis cell, where the electrolysis cell, in particular embodiments, is used on the cathode side for reduction of carbon dioxide and/or CO. The configuration of the anode space and of the cathode space is likewise not particularly restricted.

First configurations by way of example for an illustrative construction of general electrolysis cells and of possible anode and cathode spaces are shown in FIGS. 1 to 4 and 29. An electrochemical reduction of, for example, $CO_2$ and/or CO takes place in an electrolysis cell that typically consists of an anode and a cathode space. FIGS. 1 to 4 below show examples of a possible cell arrangement. For each of these cell arrangements it is possible to use a gas diffusion electrode, for example as cathode. FIGS. 1 to 4 and also FIG. 29 show, by way of example, membranes M for separation of catholyte and anolyte, but these may also be supplemented or replaced, for example, by diaphragms.

In some embodiments, the cathode space II in FIG. 1 is configured such that a catholyte is supplied from the bottom, and it leaves the cathode space II at the top. In some embodiments, the catholyte can also be supplied from the top, as, for example, in the case of falling-film electrodes. $CO_2$ and/or CO, for example, can be supplied via the gas diffusion electrode K. At the anode A, which is electrically connected to the cathode K by means of a power source for provision of the voltage for the electrolysis, the oxidation of a substance which is supplied from the bottom, for example with an anolyte, takes place, and the anolyte then leaves the anode space together with the product of the oxidation. This 2-chamber construction differs from the 3-chamber construction in FIG. 2 in that a reaction gas, for example carbon dioxide or CO, can be conveyed into the cathode space II for reduction through a porous gas diffusion electrode as cathode. Although they are not shown, some embodiments include a porous anode.

Both in FIG. 1 and in FIG. 2, the spaces I and II are separated by a membrane M. By contrast, in the PEM (proton or ion exchange membrane) construction of FIG. 3, a porous cathode K and a porous anode A directly adjoin the membrane M, which separates the anode space I from the cathode space II. The construction in FIG. 4 corresponds to a mixed form of the construction from FIG. 2 and the construction from FIG. 3, with provision on the catholyte side of a construction with a gas diffusion electrode, as shown in FIG. 2, whereas a construction as in FIG. 3 is provided on the anolyte side. Of course, mixed forms or other configurations of the electrode spaces shown by way of example are also conceivable.

In some embodiments, there is no a membrane. In some embodiments, the cathode-side electrolyte and the anode-side electrolyte may thus be identical, and the electrolysis cell/electrolysis unit need not have a membrane. Sufficient gas separation can then be achieved, for example, via appropriate construction of the electrolysis cell. In some embodiments, the electrolysis cell, has a membrane and/or a diaphragm or multiple membranes and/or diaphragms, for example 2, 3, 4, 5, 6 or more membranes and/or diaphragms which may be the same or different, but this may be associated with additional complexity with regard to the membrane and also the voltage applied. Catholyte and anolyte may optionally also be mixed again outside the electrolysis cell.

FIGS. 1 to 4 are schematic diagrams. The electrolysis cells from FIGS. 1 to 4 may also be combined to form mixed variants. For example, the anode space may be executed as a PEM half-cell, as in FIG. 3, while the cathode space consists of a half-cell containing a certain electrolyte volume between membrane and electrode, as shown in FIG. 1. Flow-by operation is also possible in an electrolysis cell, in which case the electrolysis cell may also have a construction as shown in FIG. 29. In the embodiments of FIG. 29, it is then possible here for the $CO_2$ to diffuse through the gas diffusion electrode and reach the catholyte.

In some embodiments, the distance between electrode and membrane and/or diaphragm is very small or 0 when the membrane and/or diaphragm is in porous form and includes a feed for the electrolyte. The membrane and/or diaphragm may also be in multilayer form, such that separate feeds of anolyte and catholyte are enabled. Separation effects in the case of aqueous electrolytes can be achieved, for example, by virtue of the hydrophobicity of interlayers and/or a corresponding adjustment of the prevailing capillary forces. Conductivity can nevertheless be assured when conductive groups are integrated into such separation layers. The membrane and/or the diaphragm may be an ion-conductive membrane and/or an ion-conductive diaphragm, or a separator that brings about merely a mechanical separation and is permeable to cations and anions.

In some embodiments, the electrode comprises a gas diffusion electrode that enables construction of a three-phase electrode. For example, a gas can be supplied to the electrically active front side of the electrode from the back, in order to implement the electrochemical reaction there. In some embodiments, the flow may also merely pass by the gas diffusion electrode, meaning that a gas such as $CO_2$ and/or CO is guided past the reverse side of the gas diffusion electrode in relation to the electrolyte, in which case the gas can penetrate through the pores of the gas diffusion electrode and the product can be removed at the back.

In some embodiments, even though a gas such as $CO_2$ does not "bubble" through the electrolyte, similarly high Faraday efficiencies (FE) of products are nevertheless found. For example, the gas flow in the case of flow-by may be reversed relative to the flow of the electrolyte in order that any liquid forced through can be transported away. In this case too, a gap between the gas diffusion electrode and the membrane may be used as electrolyte reservoir.

The supply of a gas can additionally also be accomplished in another way for the gas diffusion electrode shown in FIG. 3, for example in the case of supply of $CO_2$. By virtue of the gas, e.g. $CO_2$, being guided through the electrode in a controlled manner, it is again possible to rapidly discharge the reduction products.

In some embodiments, the electrolysis cell has a membrane and/or diaphragm that separates the cathode space and the anode space of the electrolysis cell in order to prevent mixing of the electrolytes. The membrane and/or diaphragm is not particularly restricted here, provided that it separates the cathode space and the anode space. More particularly, it essentially prevents passage of the gases formed at the cathode and/or anode to the anode space or cathode space. In some embodiments, the membrane comprises an ion exchange membrane, for example a polymer-based ion exchange membrane. In some embodiments, a material for an ion exchange membrane is a sulfonated tetrafluoroethylene polymer such as Nafion®, for example Nafion® 115. As well as polymer membranes, it is also possible to use ceramic membranes, for example those mentioned in EP 1685892 A1 and/or zirconia-laden polymers, e.g. polysulfones.

In some embodiments, at least one membrane and/or at least one diaphragm, especially at least one anion exchange membrane (e.g. Tokuyama A201) and/or an anion exchange diaphragm, is not in contact with the anode. In some embodiments, at least one further membrane and/or one further diaphragm, for example a cation exchange membrane and/or a cation exchange diaphragm, e.g. a Nafion®-based membrane, is provided between an anion exchange membrane and/or an anion exchange diaphragm, in which case an electrolyte spar may be provided in between. In some embodiments, the electrolysis cell comprises 2 or more, e.g. 3, 4, 5, 6 or more, membranes and/or diaphragms, in which case electrolyte spaces may be provided between the various membranes and/or diaphragms and/or the membranes and/or diaphragms and the electrodes. In some embodiments, the electrolysis cell of the invention comprises at least one anion exchange membrane and/or one anion exchange diaphragm and at least one cation exchange membrane and/or one cation exchange diaphragm. In some embodiments, the cation exchange membrane and/or the cation exchange diaphragm is in direct contact with the anode. In some embodiments, an anion exchange membrane and/or an anion exchange diaphragm is in direct contact with the gas diffusion electrode which is connected as the cathode.

By means of the use of anion transport resins or ionomers, it is possible to ensure ionic connection of the GDE to an anion exchange membrane and/or an anion exchange diaphragm in a zero-gap arrangement. This step may be advantageous for this mode of operation since, otherwise, increased salt formation can be observed in the region of the boundary layer between GDE and anion exchange membrane that can ultimately lead to complete insulation of the GDE.

Furthermore, the material of the anode is not particularly restricted and depends primarily on the desired reaction. Illustrative anode materials include platinum or platinum alloys, palladium or palladium alloys and glassy carbon. Further anode materials are also conductive oxides such as doped or undoped $TiO_2$, indium tin oxide (ITO), fluorine-doped tin oxide (FTO), aluminum-doped zinc oxide (AZO), iridium oxide, etc. These catalytically active compounds may optionally also merely be applied to the surface using thin-film technology, for example on a titanium and/or carbon carrier.

For the use of gas diffusion electrodes produced with ion exchange material, especially with anion exchange resin and/or ionomer, by way of example, the modes of operation shown in FIG. 11 to FIG. 14 are also possible, and it is also possible here, in some embodiments, to provide diaphragms rather than membranes.

FIGS. 11 to 14 show, in principle, two cell variants for the electrolysis cells: all cell variants use an all-active catalyst GDE with single-layer construction, for example rolled onto a mesh, that has been produced or impregnated with an anion exchange resin or ionomer as anion transport material and is in direct contact with the AEM. In all cases, gaseous $CO_2$ is supplied from the reverse side of the GDE without complete passage, which can also be regarded as a flow-by variant. In the cells shown, as is also generally the case for a reduction method, a gas such as $CO_2$ and/or CO may be moistened before it arrives at the GDE.

In the variants shown in FIGS. 11 and 12, there is a gap flooded by electrolyte 45 on the anode side with anode A1, which takes the form of a dimensionally stable anode. In the variants shown in FIGS. 13 and 14, the anode A1, A2 has direct contact with the membrane M2, with the anode catalyst of the anode A2 in FIG. 14 having been pressed directly onto the membrane M2, for example a Nafion® membrane (catalyst coated membrane; CCM). A further peculiarity of the variants shown in FIGS. 13 and 14 is that the product gas P formed on the anode side is not contaminated with $CO_2$ since the hydrogencarbonate penetrates only up to the middle electrolyte gap, where it can be broken down by $H^+$.

In the execution of the anode, it may e advantageous to avoid direct contact with an anion exchange membrane M1 owing to stability problems that have been observed. This is true both of the CCM design in FIG. 14, in which the anode catalyst, e.g. an IrOx catalyst, is pressed directly into the membrane M2, and of the use of a dimensionally stable anode A1 that may consist, for example, of an IrOx-coated expanded titanium metal. The gap between the anode and the GDE (cathode) may be as small as possible in order to achieve maximum efficiency of the system. This distance may be assured, for example, by a thin spacer (e.g. plastic mesh, diaphragm, etc.; not shown), which may have zero electrical conductivity but has high ion conductivity. In the variants shown in FIGS. 13 and 14, direct binding of the anode to the membrane is possible since the Nafion polymer of the membrane M2 is stable to IrOx.

Owing to an electrophoretic separation of the electrolyte, in the case of use of an anion exchange membrane as membrane M1 in the variants shown in FIGS. 11 and 12, increased formation of $CO_2$ can be detected at the anode A1 since hydrogencarbonate ($HCO_3$) that has originally been formed at the cathode GDE (e.g. $KOH+CO_2{=}KHCO_3$) is discharged here and gets into the anolyte via the anion exchange membrane M1. As a result of this construction, as well as oxygen, a large amount of $CO_2$ can be formed at the anode A1, such that an unwanted waste gas mixture is formed and, ultimately, $CO_2$ can be lost.

This can be avoided in the variants shown in FIGS. 13 and 14 by the use of two membranes, since the $CO_2$ formation from $HCO_3$ in the internal electrolyte gap can take place according to the following reaction: $HCO_3+H^+{=}CO_2+H_2O$. By virtue of the corresponding arrangement, a gas separation between $CO_2$ and $O_2$ is enabled, by means of which $CO_2$ can be removed and provided to the reaction again. The mode of operation shown describes the diffusion operation of the gas diffusion electrode, wherein gaseous reactants ($CO_2$ here) and products P can be provided via the reverse side of the electrode without these passing through the electrode. The gas pressure used may be chosen depending on the bubble point (e.g. range of 1-50 mbar) of the electrode GDE such that there is no passage of gas. One advantage of this mode of operation may be a higher conversion of the $CO_2$ used compared to the flow-through variant.

The production technique described can constitute the basis for the production of electrodes of a larger scale that can achieve current densities >200 mA/cm² according to the mode of operation. More particularly, not all methods known to date for production of ethylene-selective Cu electrodes are suitable for scaleup, or they are not dimensionally stable, but nor are other electrolysis cells for reduction of $CO_2$ and/or CO. The use of ion transport material, for example resins, in the gas diffusion electrode GDE enables electrolysis operation with long-term stability for a catalyst-based GDE in the cell arrangements shown in FIGS. 1 to 4 and 11 to 14 at high current densities in salt-containing electrolytes.

The anode reaction in the electrolysis cell is in no way limited to the production of oxygen. Further examples are peroxodisulfate formation or chlorine production. Especially in the case of chlorine production, the avoidance of deposition of salts is particularly important since $NaHCO_3$, for example, is one of the more sparingly soluble carbonates and constitutes the outlet channel for the sodium ions as illustrative cations of the electrolyte 45. Advantageous for the conductivity of the electrolyte and for further workup are therefore concentrated solutions close to the saturation limit (for example for $NaHCO_3$: 96 g/L (20° C.); 165 g/L (60° C.); 236 g/L (100° C.)). The anion transport material, e.g. anion exchange material, can prevent excessive diffusion of the sodium ions into the gas diffusion electrode. This may be important particularly for operation at high current densities and high operating temperatures in order to more easily transport the resultant ions away and to counteract elevated mobility of cations, e.g. sodium ions.

Just like the electrolysis cells shown in FIGS. 1 to 4 and 29, it is also possible to combine the electrolysis cells shown in FIGS. 11 to 14 to give mixed variants. For example, it is again possible to execute the anode space as a PEM half-cell, while the cathode space may consist of a half-cell that contains a certain electrolyte volume between membrane M, M1, M2 and electrode. In some embodiments, the distance between electrode and membrane M, M1, M2 is very small or 0 when the membrane is in porous form and includes a feed for the electrolyte. The membranes M, M1, M2 may also be in multilayer form, such that separate feeds of anolyte or catholyte are enabled. Separation effects can be achieved, for example in the case of aqueous electrolytes, for example by virtue of the hydrophobicity of interlayers. Conductivity can nevertheless be assured when, for example, ion-conductive groups are integrated into such separation layers. The membranes M, M1, M2 may be an ion-conducting membrane, or a separator that brings about merely mechanical separation.

An abstract diagram of an apparatus of a general electrolysis system is shown in FIG. 5. FIG. 5 shows, by way of example, an electrolysis in which carbon dioxide is reduced on the cathode side and water is oxidized on the anode A side, although other reactions may also proceed, for example on the anode side. On the anode side, in further examples, it would be possible for a reaction of chloride to give chlorine, bromide to give bromine, sulfate to give peroxodisulfate (with or without evolution of gas), etc. to take place. Examples of suitable anodes A are platinum or iridium oxide on a titanium carrier, and an example of a cathode K is an electrode for reduction of $CO_2$, for example based on Cu. The two electrode spaces of the electrolysis cell are separated by a membrane M, for example of Nafion®. The incorporation of the cell into a system with anolyte circuit 10 and catholyte circuit 20 is shown in schematic form in FIG. 5.

On the anode side, in this illustrative embodiment, water with electrolyte additions is fed into an electrolyte reservoir vessel 12 via an inlet 11. In some embodiments, water is supplied additionally or instead of the inlet 11 at another point in the anolyte circuit 10, since, according to FIG. 5, the electrolyte reservoir vessel 12 is also used for gas separation. The water is pumped out of the electrolyte reservoir vessel 12 by means of the pump 13 into the anode space, where it is oxidized. The product is then pumped back into the electrolyte reservoir vessel 12, where it can be led off into the product gas vessel 14. The product gas can be removed from the product gas vessel 14 via a product gas outlet 15. It is of course also possible for the product gas to be separated off elsewhere, for example in the anode space as well. The result is thus an anolyte circuit 10 since the electrolyte is circulated on the anode side.

On the cathode side, in the catholyte circuit 20, carbon dioxide is introduced via a $CO_2$ inlet 22 into an electrolyte reservoir vessel 21, where it is physically dissolved for example. By means of a pump 23, this solution is brought into the cathode space, where the carbon dioxide is reduced at the cathode K. An optional further pump 24 then pumps the solution obtained at the cathode K further to a vessel for gas separation 25, where a product gas can be led off into a product gas vessel 26.

The product gas can be removed from the product gas vessel 26 via a product gas outlet 27. The electrolyte is in turn pumped out of the vessel for gas separation back to the electrolyte reservoir vessel 21, where carbon dioxide can be added again. Here too, merely an illustrative arrangement of a catholyte circuit 20 is specified, and the individual apparatus components of the catholyte circuit 20 may also be arranged differently, for example in that the gas separation is effected at an early stage in the cathode space. In some embodiments, the gas separation and gas saturation are effected separately, meaning that the electrolyte is saturated with $CO_2$ in one of the vessels and then is pumped through the cathode space as a solution without gas bubbles. The gas that leaves the cathode space may then consist to a predominant degree of product gas since $CO_2$ itself can remain dissolved and/or since it has been consumed, and hence the concentration in the electrolyte is somewhat lower. The electrolysis is effected in FIG. 5 by addition of current via a current source (not shown).

In order to be able to control the flow of the water and of the $CO_2$ dissolved in the electrolyte, valves 30 may optionally be introduced in the anolyte circuit 10 and catholyte circuit 20. The valves 30 are shown in the figure upstream of the inlet into the electrolysis cell, but may also be provided, for example, downstream of the outlet from the electrolysis cell and/or elsewhere in the anolyte circuit or catholyte circuit. It is also possible, for example, for a valve 30 to be upstream of the inlet into the electrolysis cell in the anolyte circuit, while the valve in the catholyte circuit is beyond the electrolysis cell, or vice versa.

Figure 6:
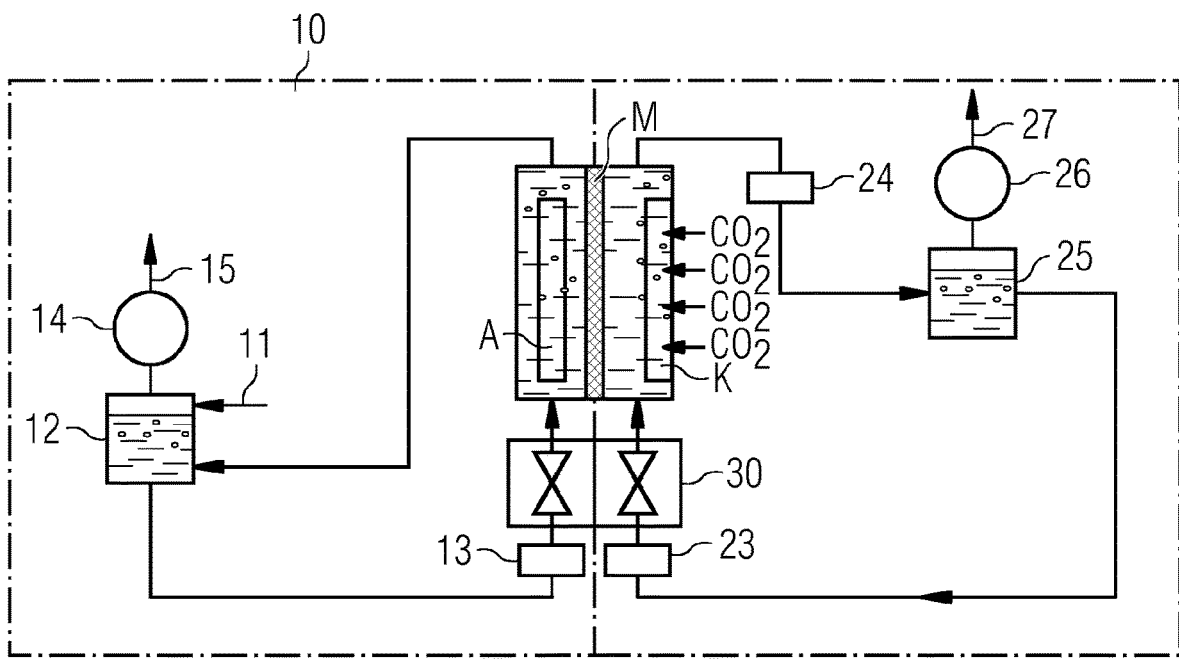
FIG. 6 shows a further illustrative configuration of an electrolysis system for $CO_2$ reduction.

An abstract diagram of an illustrative apparatus of an electrolysis system is shown in FIG. 6. The apparatus in FIG. 6 corresponds here to that of FIG. 5, with introduction of the addition of carbon dioxide into an electrolyte reservoir vessel 21 not via a $CO_2$ inlet, but directly via the cathode K which is configured here as the gas diffusion electrode of the invention. In this case, the $CO_2$ can be supplied, for example, by flow-by or flow-through of the gas diffusion electrode.

Figure 30:
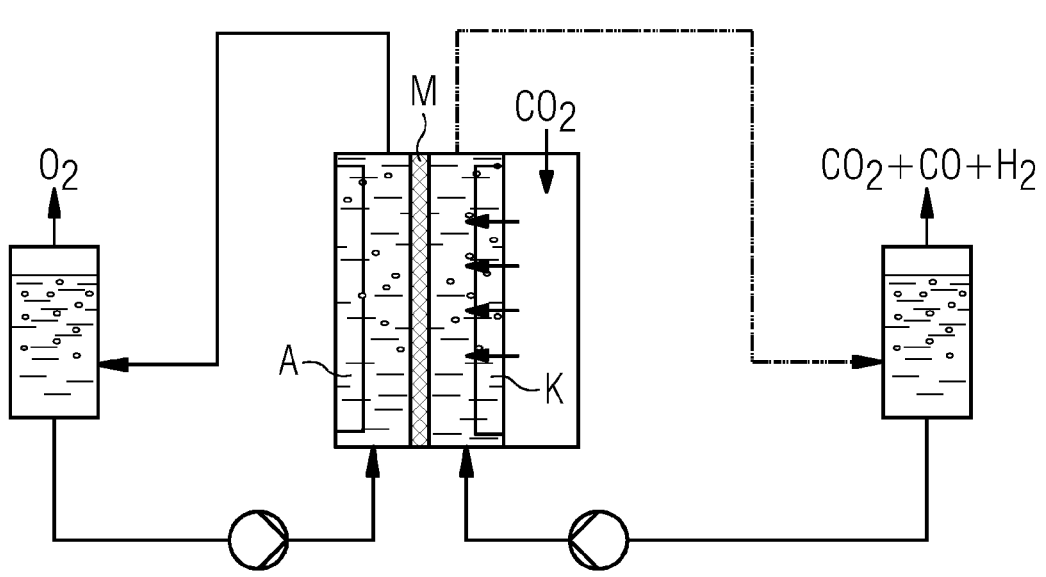
FIGS. 30 and 31 show further illustrative configurations of an electrolysis system incorporating teachings of the present disclosure for $CO_2$ reduction.
Figure 31:
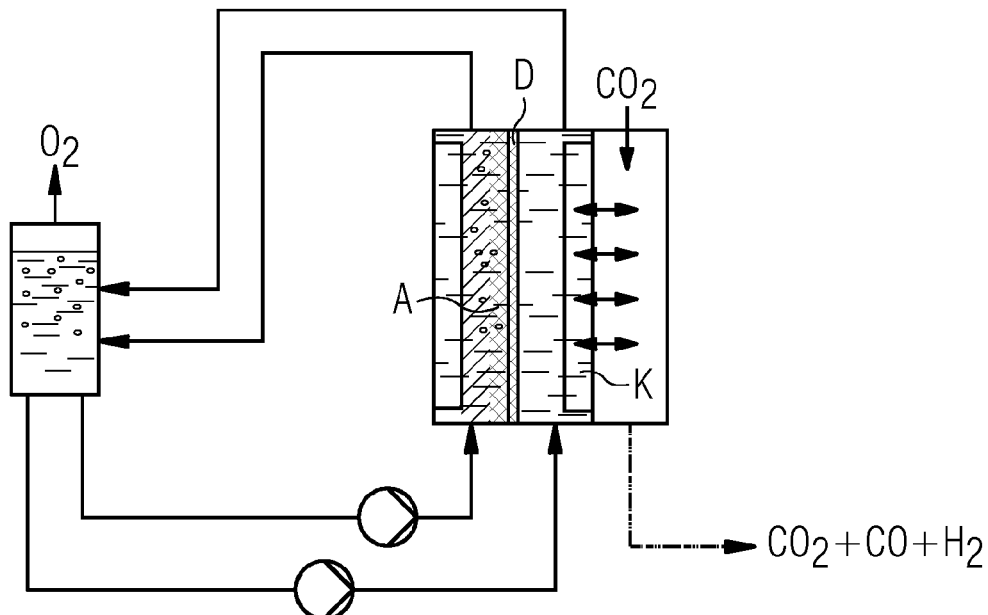

Further illustrative apparatuses of the invention with flow-through and flow-by gas diffusion electrodes as cathodes are shown in FIGS. 30 and 31, with the carbon dioxide being conducted in countercurrent here. In FIG. 31, a diaphragm D is also provided rather than a membrane. In some embodiments, apparatuses with mixed anolytes and catholytes are possible via use of appropriate electrolysis cells, as also described by way of example above.

The composition of a liquid or solution, for example an electrolyte solution, which is supplied to the electrolysis unit is not particularly restricted here, and may include all possible liquids or solvents, for example water in which electrolytes such as conductive salts, ionic liquids, substances for electrolytic conversion such as carbon dioxide, which may be dissolved in water for example, additives for improving the solubility and/or wetting characteristics, defoamers, etc. may optionally additionally be present. The catholyte may include carbon dioxide for example.

The liquids or solvents, any additional electrolytes such as conductive salts, ionic liquids, substances for electrolytic conversion, additives for improving solubility and/or wetting characteristics, defoamers, etc. may be present at least in one electrode space or in both electrode spaces. It is also possible in each case for two or more of the substances or mixtures thereof mentioned to be included. These are not particularly restricted in accordance with the invention and may be used on the anode side and/or on the cathode side.

Rather than the construction of an electrolysis system which is shown in FIGS. 6, 30 and 31 with an electrolysis cell comprising an anode space with anode A, a membrane M and a cathode space with gas diffusion electrode K, it is also possible to employ, for example, the electrolysis cells shown in FIGS. 1-4 or FIGS. 11-14 in an electrolysis system of the invention. The electrolysis cell or the electrolysis system may be used, for example, in an electrolysis of carbon dioxide and/or CO.

In some embodiments, there is a method of electrolysis of $CO_2$ and/or CO, wherein the gas diffusion electrode of the invention or the electrolysis cell or the electrolysis system is used. In some embodiments, the method takes place at a temperature of 40° C. or more, for example 50° C. or more. In some embodiments, an aqueous electrolyte is used.

The electrochemical reduction of $CO_2$ and/or CO may take place in an electrolysis cell that typically consists of an anode space and a cathode space. Anode space and cathode space are typically kept separate from one another by at least one ion-selective membrane or a diaphragm. FIGS. 1 to 4 and 11 to 14 show examples of possible cell arrangements of electrolysis cells for the electrolysis of $CO_2$ and/or CO, which are also described in detail above. Each of these cell arrangements can be used to perform the electrolysis methods taught herein. In some embodiments, the electrochemical reduction of $CO_2$ and/or CO is effected in flow-by mode.

Some embodiments include processes for producing a gas diffusion electrode comprising a metal M selected from Ag, Au, Cu, Pd and mixtures and/or alloys and/or salts thereof, and at least one binder, wherein the gas diffusion electrode comprises hydrophilic and hydrophobic pores and/or channels, wherein an ion transport material is present at least to some degree in the pores and/or channels of the gas diffusion electrode and/or an ion exchange material has been applied to at least some of the surface of the gas diffusion electrode, comprising production of a mixture comprising at least the metal M, the ion transport material and the at least one binder, application of the mixture comprising at least the metal M, the ion transport material and the at least one binder to a carrier, e.g. in the form of a sheetlike structure, and dry or moistened rolling of the mixture onto the carrier to form a layer; or production of a first mixture comprising at least the metal M, the ion transport material and optionally at least one binder, production of a second mixture comprising at least the metal M and at least one binder, application of the second mixture comprising at least the metal M and the at least one binder to a carrier, e.g. in the form of a sheetlike structure, application of the first mixture comprising at least the metal M, the ion transport material and optionally at least one binder to the second mixture, optional application of further mixtures to the first mixture, and dry or moistened rolling of the second and first mixture and any further mixtures onto the carrier to form a second and a first layer and optionally further layers; or provision of a gas diffusion electrode comprising a metal M selected from Ag, Au, Cu, Pd and mixtures and/or alloys and/or salts thereof, and at least one binder, wherein the gas diffusion electrode comprises hydrophilic and hydrophobic pores and/or channels, and at least partial introduction of an ion transport material into the pores and/or channels of the gas diffusion electrode and/or at least partial application of an ion transport material to the surface of the gas diffusion electrode.

In some embodiments, the corresponding features of the gas diffusion electrode can be employed in this production process as well. More particularly, the proportions by weight of the constituents can also be suitably adjusted in the production in accordance with the proportions by weight in the gas diffusion electrode and the corresponding materials can be used as metal M, ion transport material and binder. It is also in particular embodiments possible to suitably add the above-described promoters.

The producing of the first and second mixtures, or of the first mixture, is not particularly restricted here and can be effected in a suitable manner, for example by stirring, dispersing, etc. If a second mixture is applied, the first mixture may also include 0% by weight of binder, i.e. no binder, since, in the rolling operation, binder from the second mixture can be pressed into the first layer that forms from the first mixture and hence the first layer as well can have a content of binder of, for example, at least 0.1% by weight, for example 0.5% by weight. In some embodiments, however, the first mixture, in the case of application of 2 or more mixtures, contains binder.

In some embodiments, the binder comprises a polymer, for example a hydrophilic and/or hydrophobic polymer, for example a hydrophobic polymer, e.g. PTFE. This allows a suitable adjustment of the predominantly hydrophobic pores or channels to be achieved.

In some embodiments, the metal M for the production of the mixture is in the form of particles or catalyst particles that have, for example, a uniform particle size between 1 and 80 μm, 10 to 50 μm, or between 30 and 50 μm. The particle size can be determined here, for example, by microscopy by means of image analysis, by laser scattering and/or by dynamic light scattering. In addition, the catalyst particles, in some embodiments, have high purity without extraneous metal traces. By suitable structuring, optionally with the aid of promoters, as described above, it is possible to achieve a high selectivity and long-term stability.

By suitable adjustment of the particle sizes of metal M, ion transport material and binder and any further additions such as promoters, it is possible to adjust the pores and/or channels, i.e. the hydrophobic and hydrophilic pores and/or channels, of the GDE in a controlled manner for the passage of gas and/or electrolyte and hence for the catalytic reaction. The application of a first and further mixture(s) is not particularly restricted and can be effected, for example, by scattering, sieving, bar coating, etc.

Rolling application is likewise not particularly restricted and can be effected in a suitable manner. If appropriate, for this purpose, the respective mixtures can be moistened, for example to a moisture content of 20% by weight or less, for example 5%, 4%, 3%, 2%, 1% or fewer % by weight, based on the respective mixture. Rolling of the mixture or compound (particles) into the structure of the carrier, for example a mesh structure, is explicitly desired in some embodiments in order to assure high mechanical stability of the electrode. This is not the case in a two-stage process; here, the pre-extruded film merely lies atop the mesh.

As a result, in the case of application of multiple layers as well, the mixtures for the layers may be applied individually to the carrier and then rolled on together in order to achieve better adhesion between the layers. The mechanical stress on the binder, for example polymer particles, by the rolling process leads to crosslinking of the powder by the formation of binder channels, for example PTFE fibrils. The achievement of this state may improve a porosity or mechanical stability of the electrode. The hydrophobicity can be adjusted via the respective content of polymer and ion transport material, e.g. ion exchange resin, or via the physical properties of the metal M or of the catalyst powder, for example as discussed above in connection with the gas diffusion electrodes.

The degree of fibrillation of the binder, for example PTFE, (structure parameter $\zeta$) correlates directly with the shear rate applied, since the binder, for example a polymer, behaves as a shear-thinning (psuedoplastic) fluid on rolling. After the extrusion, the resultant layer has elastic character as a result of the fibrillation. This change in structure is irreversible, and so this effect can no longer be subsequently enhanced by further rolling; instead, the layer is damaged as a result of the elastic characteristics on further action of shear forces. Particularly significant fibrillation can lead to furling of the electrode on the layer side, and so excessively high contents of binder should be avoided.

Heating of the rolls in the rolling operation can additionally promote the flow process. The preferred temperature range of the rolls is between room temperature, e.g. 20-25° C., and 200° C., e.g. 20-200° C., preferably between 40 and 100° C. In some embodiments, the rolling or calendering is conducted at a roll speed between 0.3 and 3 rpm, preferably 0.5-2 rpm. In some embodiments, the flow rate or an advance rate (of the GDE in length per unit time, for example in the calendering operation) Q is in the range from 0.04 to 0.4 m/min, preferably 0.07 to 0.3 m/min.

For dry rolling, the water content on rolling may correspond, for example, to ambient humidity at most. For example, the content of water and solvents in the rolling operation is less than 5% by weight, less than 1% by weight, and, for example, also 0% by weight.

In some embodiments, the carrier comprises a mesh, for example comprising the metal M, with a mesh size w of 0.3 mm<w<2.0 mm, or 0.5 mm<w<1.4 mm, and a wire diameter x of 0.05 mm<x<0.5 mm, or 0.1 mm≤x≤0.25 mm.

In some embodiments, the bed height y of the first mixture on the carrier in the application operation is in the range of 0.3 mm<y<3.0 mm, or 0.5 mm≤y≤2.0 mm. In the case of multiple layers, each layer may have a corresponding bed height y, but the bed heights of all layers preferably add up to not more than 3.0 mm, not more than 2 mm, or not more than 1.5 mm.

Figure 8:
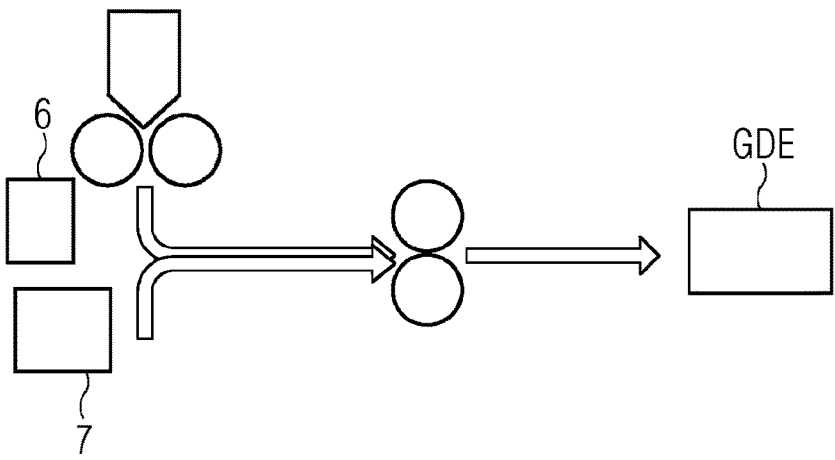
FIG. 8 shows a schematic of a production process for a gas diffusion electrode using a roll calender.

In some embodiments, the rolling is effected by a calender. In some embodiments, the process may thus be effected by a calendering process as shown in schematic form in FIG. 8 and described above.

The rolling process itself is characterized in that a reservoir of material forms upstream of the roll. In some embodiments, the gap width in the rolling operation Ho is the height of the carrier+40% to 50% of the total bed height Hf of the mixtures in the different layers, for example of the bed height y of the first mixture if only that is used, or corresponds virtually to the thickness of the mesh+feed margin 0.1-0.2 mm. The ratio between the exit thickness H and gap width Ho should preferably be in the region of 1.2.

In some embodiments, in the production process, a dry calendering method is used, in which the principle is to produce a mixture of binder, for example a cold-flowing polymer, for example PTFE, the respective powder of the metal M or of the catalyst powder and optionally of the powder of the ion transport material, for example in an intensive mixing apparatus or on laboratory scale with a cutting mill (IKA). The mixing procedure can follow the following procedure, for example: grinding/mixing for 30 sec and wait for 15 sec for a total of 6 min, based on the cutting mill with total loading 50 g. The mixed powder, after the mixing operation, attains a slightly tacky consistency. According to the amount of powder or chosen polymer or chain length or ion exchange material, the mixing time until this state is achieved may also vary. The powder mixture obtained can subsequently be scattered or sieved onto the carrier, for example a metal mesh, for example with a mesh size of >0.5 mm<1.0 mm and a wire diameter of 0.1-0.25 mm, in a suitable bed thickness. In order that the powder does not trickle through the mesh, the reverse side of the mesh can be sealed with a film. The prepared layer can then be compacted with the aid of a two-roll rolling unit (calender).

There follows a description by way of example of specific processes for production of a gas diffusion electrode comprising an anion transport material with two-layer and one-layer construction.

Production of a Gas Diffusion Electrode with Two-Layer Construction:

In order to prevent progressive flooding of the hydrophobic regions of the GDE that are required for gas transport, which is further intensified by additional mixing-in of a hydrophilic exchange resin, it is possible to use a two-layer construction for a GDE with a solid anion exchange resin. For this purpose, for example, a hydrophobic base layer as second layer, for example with 15% by weight of PTFE and 85% by weight of powder of the metal M, e.g. Cu or Ag, can be produced as current distributor on the carrier, to which a second layer with the corresponding exchange resin is applied.

The extruded base layer may have a thickness of 100-500 μm, or 250-400 μm. The base layer may be characterized, for example, by a very high conductivity, e.g. 7 mohm/cm, and have a high porosity of, for example, 50-70% and a hydrophobic character. The base layer may itself be catalytically active in the region of the overlap zone to the catalyst layer, the first layer. It may improve two-dimensional electrical connection of the electrocatalyst and, owing to the high porosity, can improve the availability of gas, for example the $CO_2$ availability.

With the aid of this method, in some embodiments, the required amount of catalyst can be reduced by a factor of 20-30. A corresponding electrocatalyst or metal M/binder, e.g. PTFE/ion exchanger mixture, may, in a subsequent step, be sieved onto the base layer for production of the first layer and likewise calendered. The preparation can also commence with the production of the catalyst layer and the application of binder, e.g. PTFE, on the reverse side of the mesh can be effected subsequently. The binder used, e.g. PTFE, can optionally likewise be pretreated beforehand in a cutting mill in order to achieve fiber formation. An illustrative production of the gas diffusion electrode with binder, e.g. PTFE-based diffusion barrier, is based on multiple steps that cannot be considered in isolation from one another, but have a maximum overlap zone in the interface regions, for example of 1-20 μm. The total layer thickness of the gas diffusion electrode may be in the range of 200-800 μm, e.g. 450-600 μm.

Figure 9:
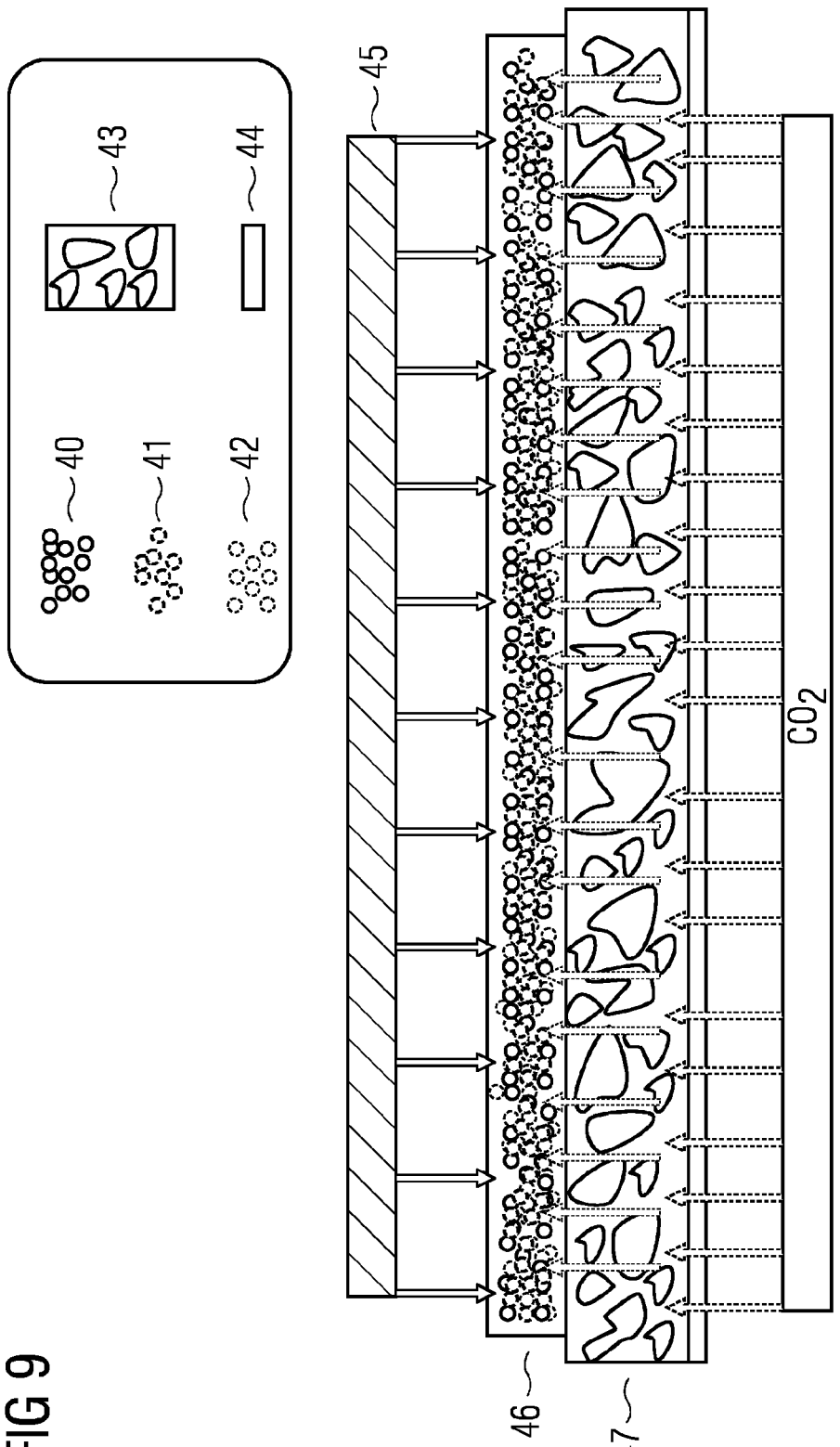
FIG. 9 shows a schematic of a construction of an illustrative gas diffusion electrode incorporating teachings of the present disclosure with input of electrolyte and gas in operation.

In some embodiments, two-layer construction enables the use of hydrophilic ion transport resins in the catalyst layer without occurrence of flooding of the gas transport pores. An illustrative schematic construction of a two-layer GDE is shown in FIG. 9, with a hydrophobic layer 47 comprising a mixture 43 of metal M and binder, e.g. Cu and PTFE, having been applied to the carrier 44 as current distributor, and a hydrophilic layer 46 thereon as first layer comprising catalyst particles 40 of the metal M, binder particles 41, e.g. PTFE and ion exchange resin 42. The hydrophilic layer 46 is reached by electrolyte 45, while the hydrophobic layer is reached by the reaction gas, e.g. $CO_2$.

Production of a Gas Diffusion Electrode with One-Layer Construction:

In the production of a one-layer catalyst-based electrode, a content of polar ion exchange polymer may be significantly reduced in order not to adversely affect the gas transport properties or prevent flooding with electrolyte. In some embodiments, the method reduces the content of polar ion exchanger to a maximum of 1-20% by weight if this is a direct constituent of the powder mixture. The production can otherwise be effected analogously to the production of a GDE with two-layer construction.

The production process may also comprise the following steps:

providing a gas diffusion electrode comprising a metal M selected from Ag, Au, Cu, Pd and mixtures and/or alloys and/or salts thereof, and at least one binder, wherein the gas diffusion electrode comprises hydrophilic and hydrophobic pores and/or channels, and at least partly introducing an ion transport material into the pores and/or channels of the gas diffusion electrode and/or at least partly applying an ion transport material to the surface of the gas diffusion electrode.

It is thus also possible to aftertreat an existing GDE, i.e., for example, a commercially available silver gas diffusion electrode from the field of chloralkali electrolysis (oxygen-depolarized cathode, ODC), comprising the metal M and binder, e.g. PTFE, for example by impregnating it directly with a microemulsion composed of ion transport resin or ionomer, for example in such a way that essentially exclusively the surface or a near-surface region of the electrode has hydrophilic properties. It is thus possible, for example, to modify an existing GDE with a potential-free diffusion barrier. In some embodiments, the method includes producing a microemulsion or microdispersion of the ion exchange material, for example anion exchange material, in water or a further suitable solvent, e.g. an alcohol such as ethanol, especially water, since penetration into the pore structure and an adverse alteration of the gas transport properties can better be prevented here.

Figure 10:
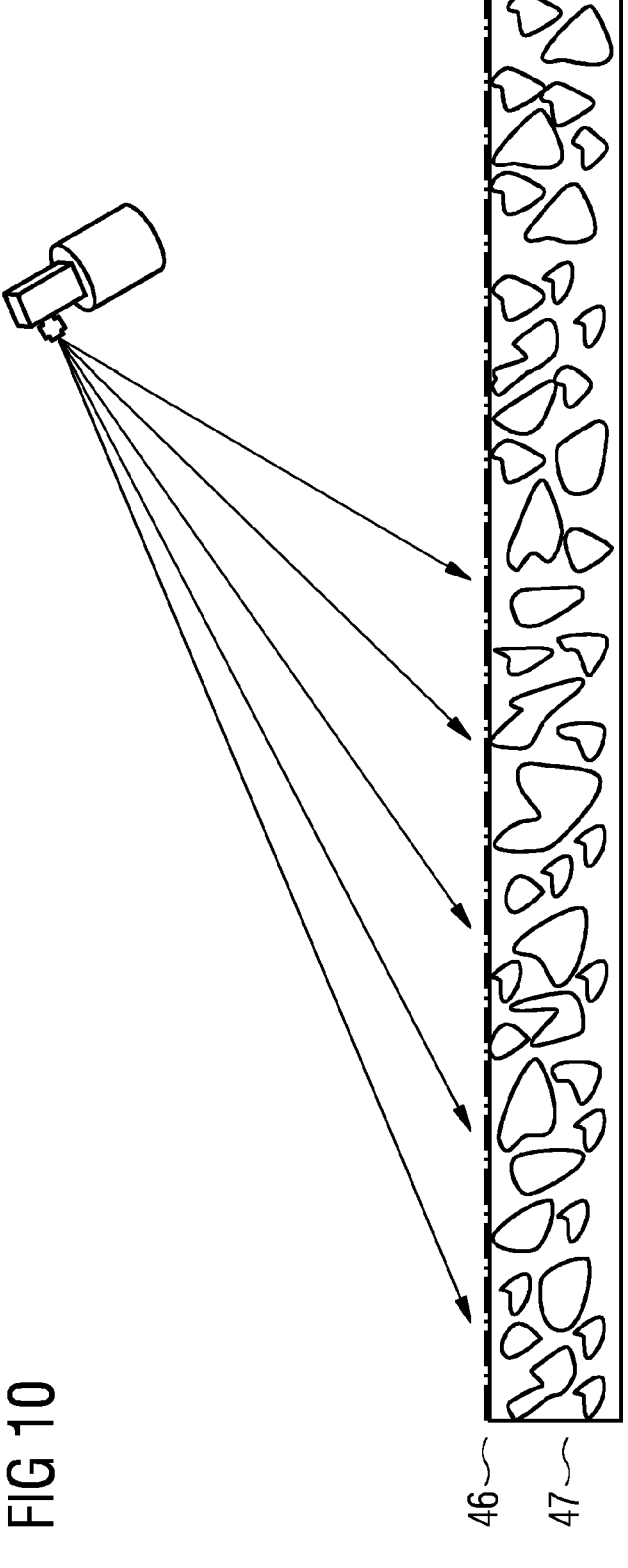
FIG. 10 shows a schematic of a treatment of a gas diffusion electrode with an ion exchange material by spray application.

FIG. 10 shows this in schematic form, and a hydrophilic coating and/or layer 46 may be formed on the hydrophobic layer 47 by virtue of the spray application. For the test scale, for example, a preparation of a gas diffusion electrode can be effected on the basis of a GDL structure, e.g. Freudenberg $C_2$, Sigracet 25 BC. For preparation of the electrode, it is possible, for example, to use a catalyst suspension of nanoparticles and ionomer in alcohol.

The above embodiments, configurations and developments can, if viable, be combined with one another as desired. Further possible configurations, developments and implementations of the teachings herein also include combinations that have not been mentioned explicitly of features of the invention that have been described above or are described hereinafter with regard to the working examples. More particularly, the person skilled in the art will also add individual aspects to the respective basic form of the present invention as improvements or supplementations. The invention is elucidated further in detail hereinafter with reference to various examples thereof. However, the scope of the present disclosure is not limited to these examples.

EXAMPLES

Example 1: Production of a One-Layer Gas Diffusion Electrode (GDE) from Pulverulent Cation Exchange Resin and Catalyst Powder (Reference Example)

1. 15 g of Amberlite IRA-900 (21.4% by weight) (chloride form; Rohm & Haas) is comminuted in an IKA A10 cutting mill for 3 min.

2. A further 5 g (7.2% by weight) of PTFE powder (Dyneon TF 1750) is added with repetition of a mixing period lasting for 3 min.

3. This is followed by the addition of 50 g (71.4% by weight) of copper powder having a particle size of 100 to 150 μm, again with mixing for 3 min.

4. The mixture is sieved onto a copper mesh (L×W=10 cm×4 cm) by means of a 0.5 mm-thick template, and the excess material is removed with a spatula or squeegee, so as to give a powder layer of uniform thickness.

5. The mesh with the sieved-on powder layer is rolled to a thickness of 500 μm in a 2-roll calender. The rolls in this step are preferably heated to a temperature of 60-80° C.

Electrochemical characterization was accomplished using an experimental setup that corresponds essentially to that of the above-described electrolysis cell or a corresponding system of FIG. 12 with flow cells for the electrolysis. In the flow cell, the cathode used was the respective gas diffusion electrode (GDE) with an active area of 3.3 cm², the gas feed rate of carbon dioxide on the cathode side was 50 mL/min, and the electrolyte flow on both sides was 130 mL/min. The anode was iridium oxide on a titanium carrier having an active area of 10 cm². The catholyte was a 1 M KHCO₃ solution with KHCO₃ in a 1 M concentration, and the anolyte was 1 M KHCO₃, each in deionized water (18 MΩ), each in an amount of 100 mL, and the temperature was 25° C. In addition, 0.5 M K₂SO₄ was also tried as catholyte and 2.5 M KOH as anolyte. It was not possible to assure stable electrolysis operation owing to the significant electrolyte permeability of the gas diffusion electrode.

Example 2: Production of a Two-Layer GDE Composed of Hydrophobic Base Layer and Hydrophilic Exchanger Layer with Pulverulent Cation Exchange Resin and Catalyst Powder 42.5 g of copper powder (85% by weight) and 7.5 g of Dyneon TF 1750 PTFE powder (15% by weight) are mixed in an IKA A 10 cutting mill with cemented carbide beaters for 6 min. Every 15 sec of mixing are followed by a pause for 15 sec. The powder mixture is sieved onto a current distributor (copper mesh with a mesh size of 0.375 mm and a wire thickness of 0.14 mm) through a 0.5 mm-thick stencil, and the excess material is removed with a squeegee. The mesh with the sieved-on powder layer is rolled to a thickness of 500 μm in a 2-roll calender. Preferably, the rolls in this step are heated to a temperature of 60-80° C. In a further step, the ion exchange resin-containing mixture from working example 1 is sieved onto the prepared base layer through a 0.2 mm stencil and calibrated by means of a squeegee. The double layer is rolled by means of a 2-roll calender with a gap width of 0.5 mm to give a electrode.

The cell construction to examine the product selectivity corresponded to that from example 1, except that the correspondingly produced GDE from example 2 was used as cathode. With the aid of the 2-layer variant, it was possible to prevent the complete flooding of the GDE.

Example 3: Production of a One-Layer GDE Composed of Base Layer and Sprayed-on Exchanger Layer with Cation Exchange Resin Suspension 42.5 g of copper powder (85% by weight) and 7.5 g of Dyneon TF 1750 PTFE powder (15% by weight) are mixed in an IKA A 10 cutting mill with cemented carbide beaters for 6 min. Every 15 sec of mixing are followed by a pause for 15 sec. The powder mixture is sieved onto a current distributor (copper mesh with a mesh size of 0.375 mm and a wire thickness of 0.14 mm) through a 0.5 mm-thick stencil, and the excess material is removed with a squeegee. The mesh with the sieved-on powder layer is rolled to a thickness of 500 μm in a 2-roll calender.

A 20% by weight microdispersion of IRA 900 ion exchange resin (see example 1) or the ionomer Tokuyama AS4 (Tokuyama) is sprayed onto the calendered gas diffusion electrode, so as to form a thin film. A total of 10 mL was sprayed on for every 40 cm². The cell construction to examine the product selectivity corresponded to that from example 1, except that the correspondingly produced GDE from example 3 was used as cathode.

Figures 15, 16, 17:
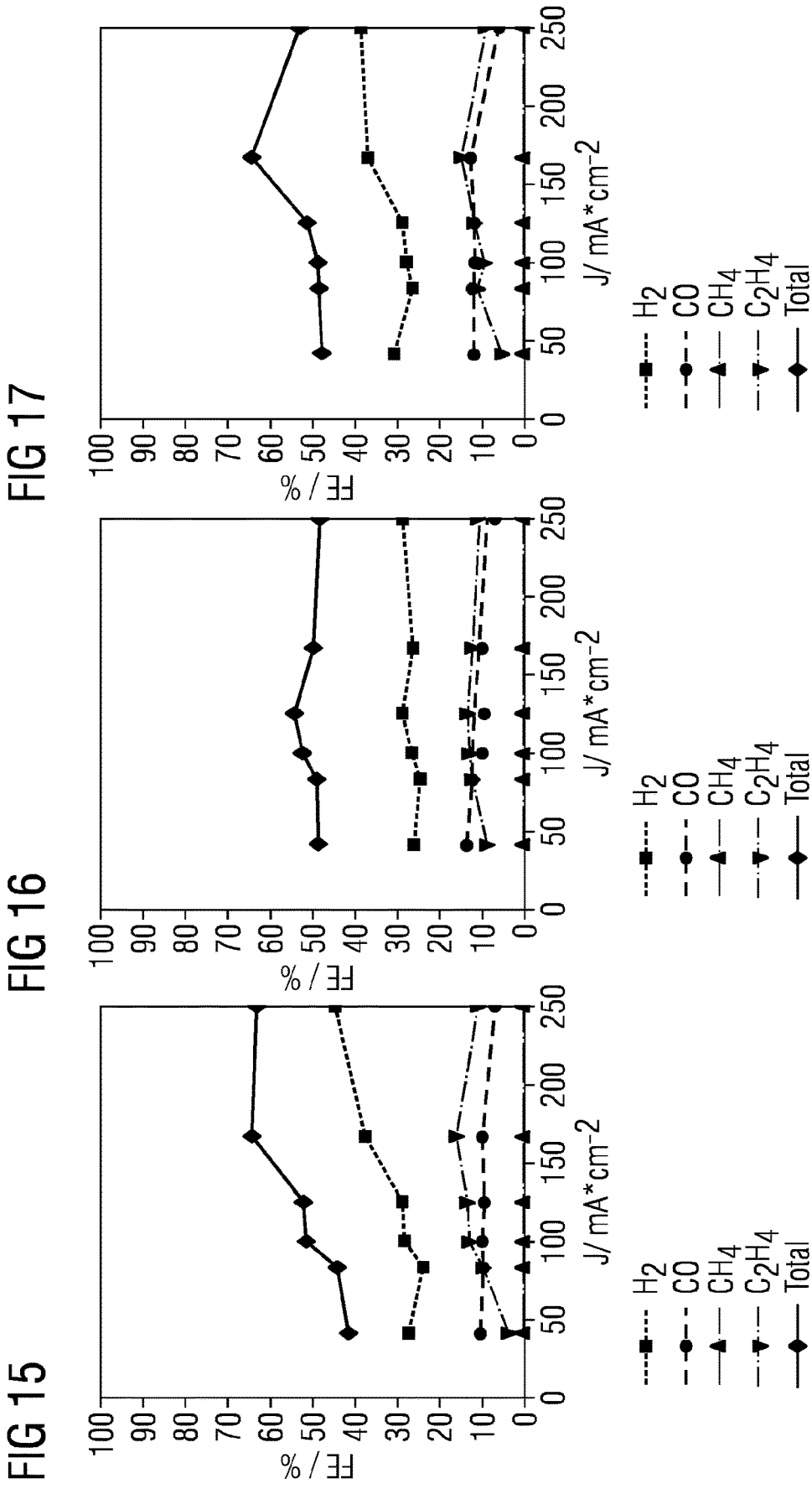
FIGS. 15 to 23 show results that are achieved using gas diffusion electrodes in the examples incorporating teachings of the present disclosure.

FIG. 15 shows the results for a pure copper GDE as comparative electrode that was not sprayed with the respective dispersion, FIG. 16 the results for the GDE impregnated with Tokuyama AS4, and FIG. 17 the results for the GDE impregnated with IRA 900. Each of the figures shows the Faraday efficiency (FE) as a function of the current density J. The comparison of the experimental data shows that the use of ion exchange resins or ionomers does not have any adverse effect on ethylene selectivity. At higher current densities, in addition, hydrogen formation is slightly suppressed compared to the pure copper catalyst; see FIGS. 16 and 17 compared to FIG. 15.

Example 4: Coating of a Hydrophobic Base Layer with the Acidic Cation Exchange Ionomer Poly(4-Styrenesulfonic Acid)

In a 4 mL snap-lid bottle, 60 mg of dendritic copper catalyst and 60 mg of an 18% by weight suspension of the cation exchange ionomer poly(4-styrenesulfonic acid) in water are weighed out and diluted with 2 mL of isopropanol, and the mixture is homogenized in an ultrasound bath for 15 min. The dispersion produced is applied to an already produced base layer (4 cm×10 cm, thickness 0.5 mm) composed of 15% by weight of PTFE and 85% by weight of copper powder with a particle diameter of the copper particles in the course of production of 100-150 μm and dried in an argon stream, and the pouring operation is repeated 3×. The electrode is dried in an argon stream for 12 h prior to use. The thickness changed only insignificantly. The cell construction to examine the product selectivity corresponded to that from example 1, except that the correspondingly produced GDE from example 4 was used as cathode.

Figure 18:
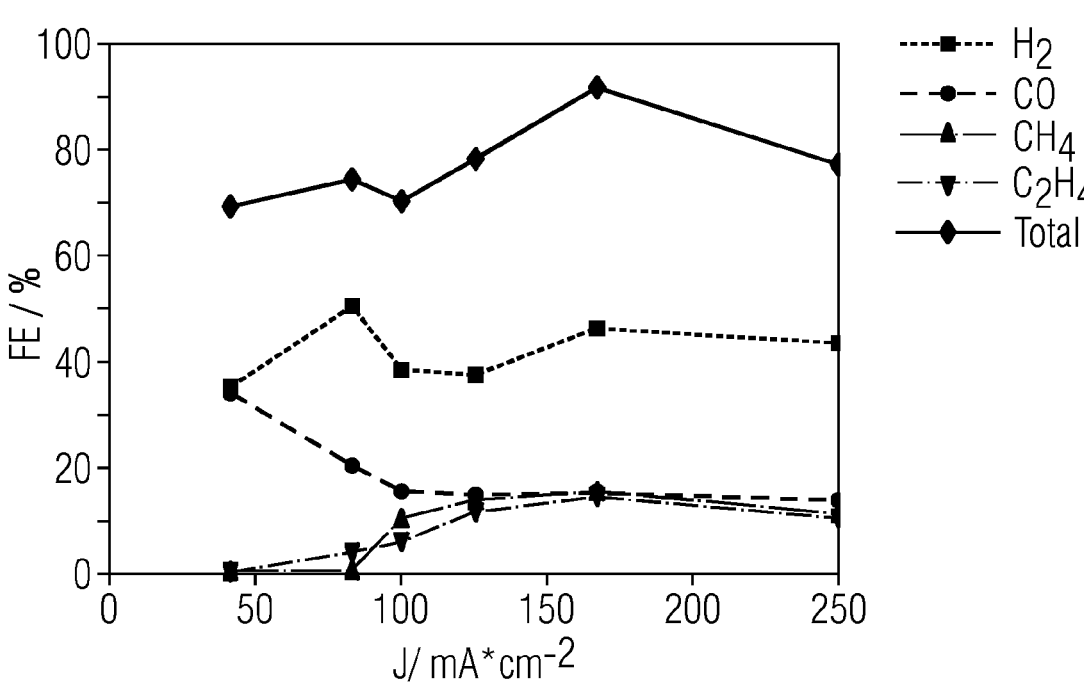

FIG. 18 shows the results with regard to the product selectivity that can be achieved with this electrode, as a function of current density. As can be seen in the figure, the acidic ionomer promotes the formation of methane (FE=15%). The Faraday efficiency for unwanted H₂ is about 45%. This shows that acidic ion exchangers are less suitable for the formation of CO and hydrocarbons. In constructions with direct contact between an acidic Nafion membrane and the catalyst, it is thus usually possible to obtain barely any, if any, hydrocarbons or CO; instead, typically exclusively hydrogen is formed.

Example 5: Coating of a Hydrophobic Base Layer with a Microemulsion Composed of the Anion Exchange Resin IRA 900 ($Me_4N^+Cl^-$; $Me=CH_3$)

In a 4 mL snap-lid bottle, 60 mg of dendritic copper catalyst powder and 120 mg of a 16.7% by weight microemulsion (20 g of IRA 900 (see example 1) with 80 g of $H_2O$, 20 g of isopropanol) are weighed out and diluted with 2 mL of isopropanol, and the mixture is homogenized in an ultrasound bath for 15 min. The dispersion produced is applied to an already produced base layer (4 cm×10 cm) composed of 15% by weight of PTFE and 85% by weight of copper powder with a particle diameter of the copper particles in the course of production of 100-150 μm and dried in an argon stream, and the pouring operation is repeated 3×. The electrode is dried in an argon stream for 12 h prior to use.

The cell construction to examine the product selectivity corresponded to that from example 1, except that the correspondingly produced GDE from example 5 was used as cathode.

Figure 19:
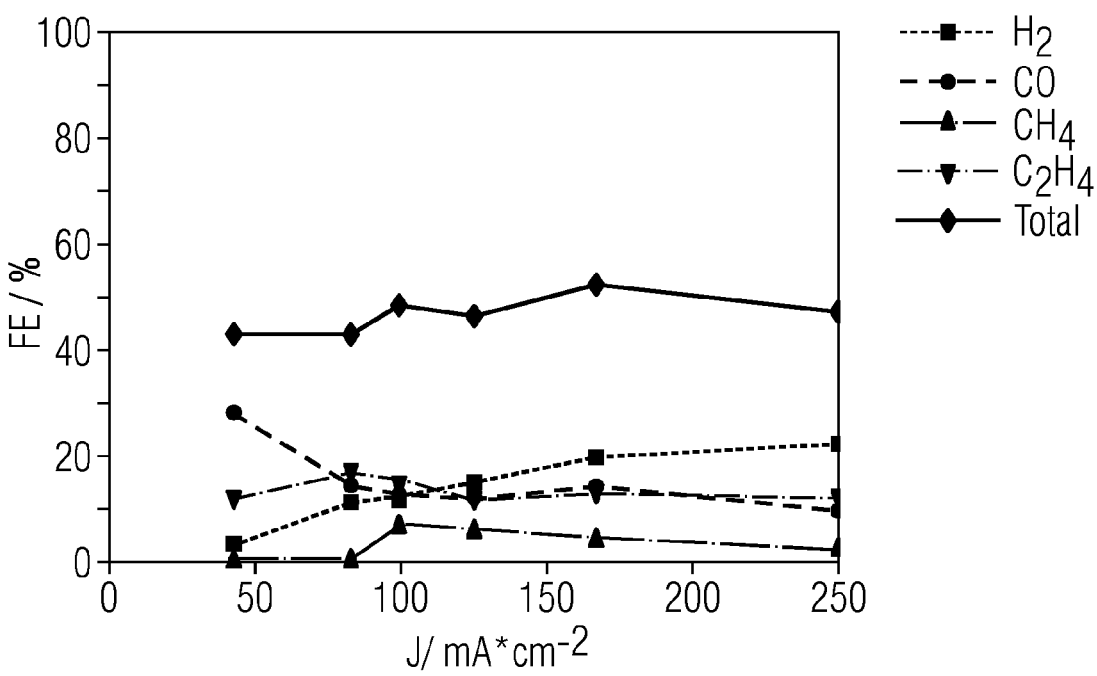

FIG. 19 shows the results with regard to the product selectivity that can be obtained with this electrode as a function of current density. As shown in the figure, the anion exchange resin suppresses the formation of hydrogen to an FE of about 20%. Methane is formed with an FE of about 5%. The formation of liquid products such as ethanol and propanol is intensified, as apparent from the deviation from the sum total of gaseous products of 100%.

Example 6: Coating of a Hydrophobic Base Layer with an Anion Exchange Ionomer Having $R_4N^+$ Groups In a 4 mL snap-lid bottle, 60 mg of dendritic copper catalyst powder and 120 mg of a 5% by weight dispersion (FUMA Tech AS4, n-propanol; FUMA Tech) are weighed out and diluted with 2 mL of n-propanol, and the mixture is homogenized in an ultrasound bath for 15 min. The dispersion produced is applied to an already produced base layer (4 cm×10 cm) composed of 15% by weight of PTFE and 85% by weight of copper powder with a particle diameter of the copper particles in the course of production of 100-150 μm and dried in an argon stream, and the pouring operation is repeated 3×. The electrode is dried in an argon stream for 12 h prior to use.

The cell construction to examine the product selectivity corresponded to that from example 1, except that the correspondingly produced GDE from example 6 was used as cathode. The cell construction to examine the product selectivity corresponded to that from example 1, except that the correspondingly produced GDE from example 6 was used as cathode.

Figure 20:
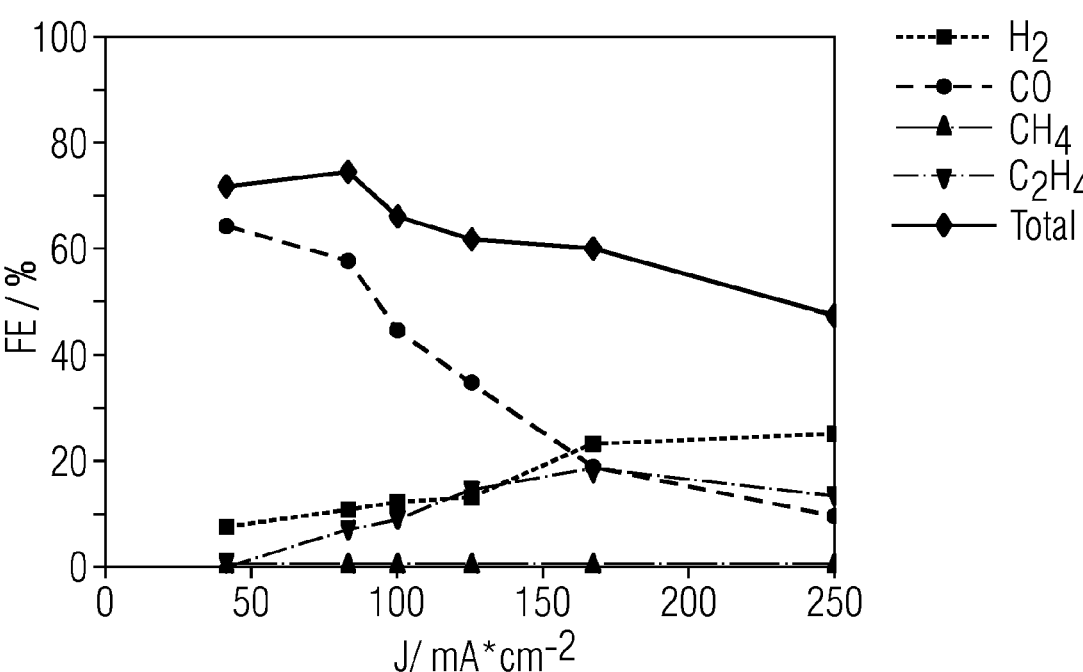

FIG. 20 shows the results with regard to the product selectivity that can be obtained with this electrode, as a function of current density. As shown in the figure, the anion exchange ionomer suppresses the formation of hydrogen to an FE of about 10-20%. The formation of methane is entirely suppressed. The formation of CO (FE=65-60%) is observed at low current densities between 40-80 mA/cm² and differs significantly. The formation of ethylene is likewise more selective compared to all the experiments conducted at higher current densities (J=about 170 mA/cm²).

Example 7: Coating of a Hydrophobic Base Layer with the Acidic Cation Exchange Ionomer (Nafion)

In a 4 mL snap-lid bottle, 60 mg of copper catalyst powder and 60 mg of a 20% by weight dispersion (solvent: 34% by weight of water, remainder: aliphatic alcohols, DuPont) (Nafion, Aldrich) are weighed out and diluted with 2 mL of isopropanol, and the mixture is homogenized in an ultrasound bath for 15 min. The dispersion produced is applied to an already produced base layer (4 cm×10 cm) composed of 15% by weight of PTFE and 85% by weight of copper powder with a particle diameter of the copper particles in the course of production of 100-150 μm and dried in an argon stream, and the pouring operation is repeated 3×. The electrode is dried in an argon stream for 12 h prior to use.

The cell construction to examine the product selectivity corresponded to that from example 1, except that the correspondingly produced GDE from example 7 was used as cathode.

Figure 21:
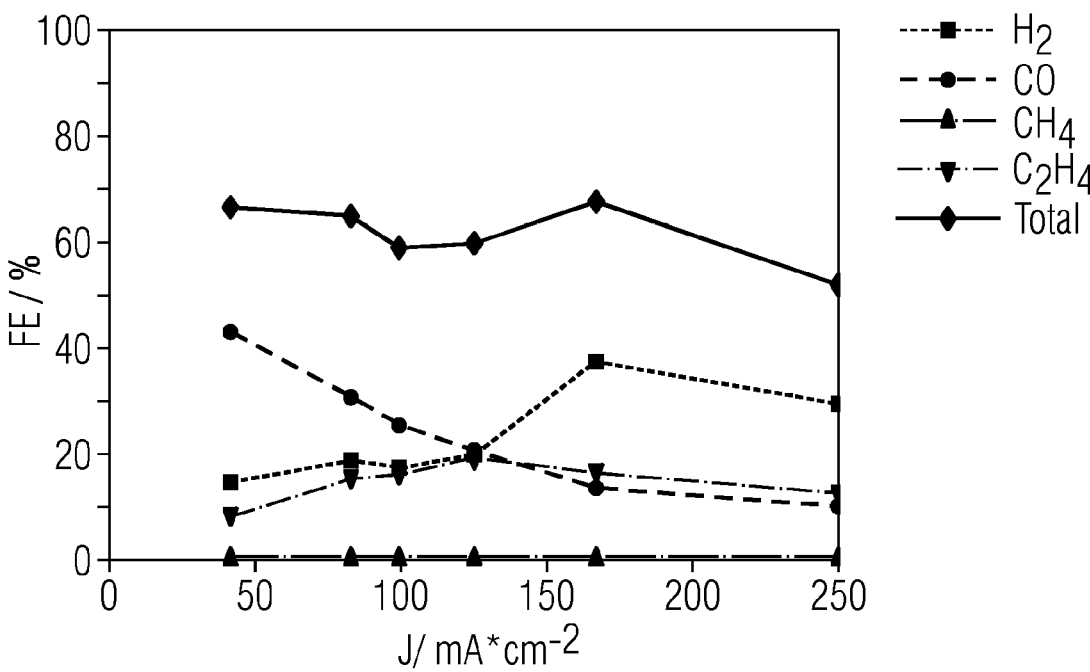

FIG. 21 shows the results with regard to the product selectivity that can be obtained with this electrode, as a function of current density. As shown in the figure, the acidic Nafion ionomer promotes the unwanted formation of hydrogen at elevated current densities with FE=about 40%. The formation of methane is entirely suppressed. The formation of CO (FE=45-35%) is observed at low current densities between 40-80 mA/cm² and differs significantly.

Example 8: Reference Experiment According to US 2016/0251766A1 Relating to Production of CO An experiment according to example 4 of US 2016/0251766A1 was conducted without modification.

Figure 22:
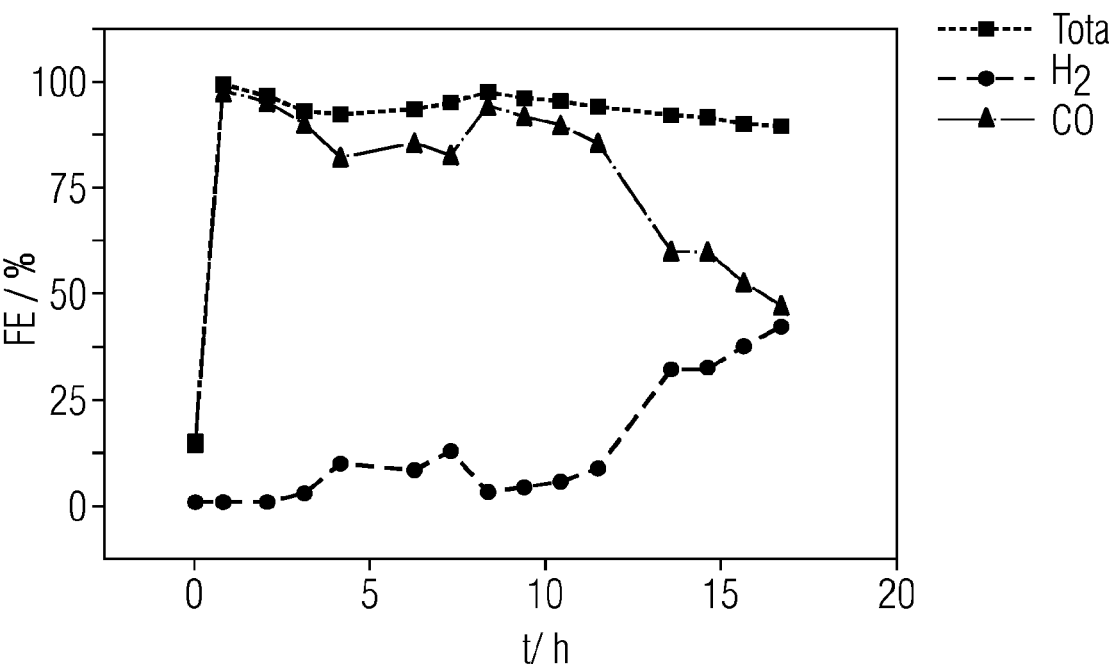

FIG. 22 shows the monitoring of the product Faraday efficiency of CO and $H_2$ over time at a constant current density of 50 mA/cm². After an operating time of 10 h, the construction in the MEA arrangement with catalyst-coated gas diffusion layers (silver cathode, iridium oxide anode) showed a decrease in CO production. After 10 h, destruction of the anode was observed since the ionomer does not withstand the oxidative conditions and is destroyed.

Example 9: Coating of a Hydrophobic Base Layer with an Anion Exchange Ionomer Tokuyama AS4 and with Additional Use of a Tokuyama AEM 207 Membrane Using a Cell Construction with a Double Membrane The GDE, in accordance with example 3, was produced with Tokuyama AS4 as anion exchange ionomer.

The cell construction to examine the product selectivity corresponded to that from example 3 with the corresponding GDE comprising Tokuyama AS4, except that, in addition, a Tokuyama AEM 207 membrane was additionally used, which was in direct contact with the GDE. The experimental setup thus corresponds to that shown in FIG. 13.

Figure 23:
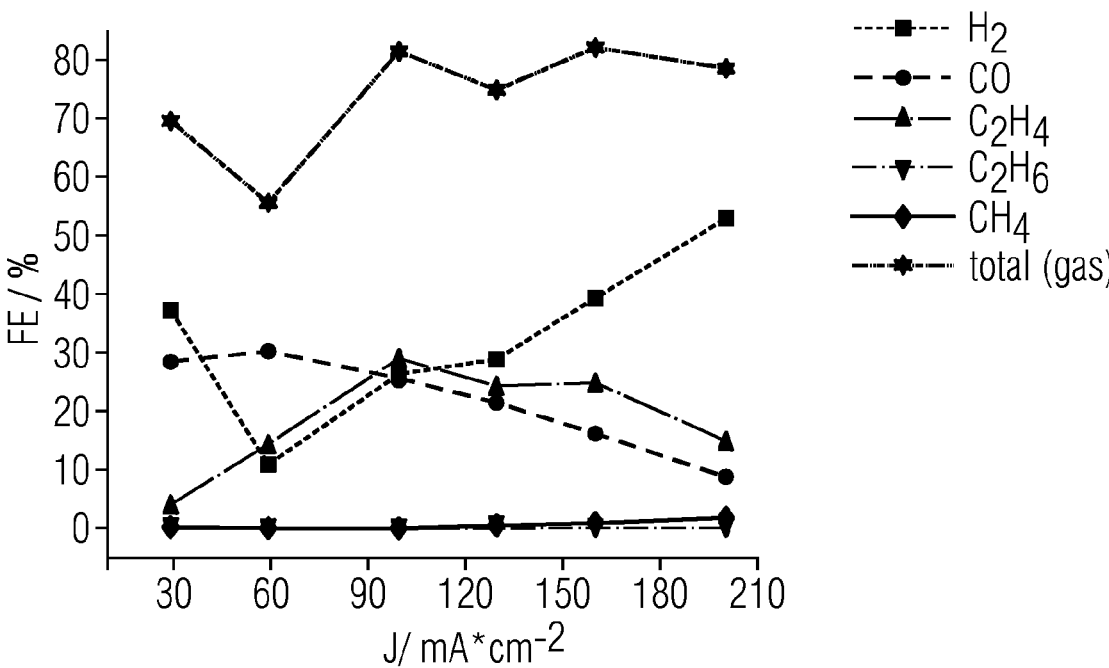

FIG. 23 shows the results with regard to the product selectivity that can be obtained with this electrode, as a function of current density. As shown in the figure, the anion exchange ionomer Tokuyama AS4 suppresses the unwanted formation of hydrogen at elevated current densities. The cell construction enables an increase in the Faraday efficiency for ethylene by a factor of 2 to 30%. The formation of methane is entirely suppressed. The formation of CO (FE=30%) is observed at low current densities between 40-80 mA/cm² and differs significantly.

Some embodiments include a process and to a corresponding electrolysis system for electrochemical carbon dioxide utilization. Carbon dioxide ($CO_2$) can be introduced into an electrolysis cell and reduced at a cathode with the aid of a gas diffusion electrode (GDE) on the cathode side. GDEs are porous electrodes in which liquid, solid and gaseous phases are present and the electrically conductive catalyst catalyzes the electrochemical reaction between the liquid phase and the gaseous phase. For electrochemical carbon dioxide utilization, some embodiments include using catalyst-based gas diffusion electrodes that are similarly known from industrial scale chloralkali electrolysis. The catalyst-based gas diffusion electrode may firstly be in contact with a liquid, e.g. salt-containing, electrolyte, or directly adjoin a separator membrane. In the latter case, an ionic attachment of the catalyst particles to the membrane may help since the membrane in this mode of operation can be used as a solid electrolyte. In order to enable ion conductivity, ion transport materials of the invention are integrated into the gas diffusion electrode, and these preferably have functional groups, for example quaternary ammonium groups, and hence function as anion transporters.

The introduction of pulverulent ion transport materials, for example exchange resins, for example anion exchange materials, into a catalyst-based gas diffusion electrode is a novel method for broadening the process window of the electrochemical reduction of $CO_2$ and/or CO. The modification especially offers advantages over and above a current density of >150 mA/cm² since the production of hydrogen can be lowered. It is possible, for example, to obtain elevated Faraday efficiencies for CO or ethylene. The method further offers the option of increasing the ionic conductivity of the gas diffusion electrode, which can reduce the formation of concentration gradients. The method additionally offers the option of using a catalyst-based gas diffusion electrode within a membrane-electrode construction, especially MEA (membrane electrode assembly).

In some embodiments, dimensionally stable gas diffusion electrodes based on catalyst powder can be produced, which can be used in an industrial scale electrolyzer application in the context of electrochemical $CO_2$, and which enable improved long-term stability of electrolysis operation. The use of ion transport materials, for example anion transport materials, especially of anion exchange resins, in the gas diffusion electrode offers a low-energy pathway to lead off the hydroxide and hydrogencarbonate ions that form, which can simultaneously prevent the inward diffusion of mobile cations from the electrolyte owing to the positive polymer backbone structure.

What is claimed is:

1. A gas diffusion electrode comprising:
a carrier;

a first catalyst layer disposed on the carrier, the first layer comprising a binder mixed with particles of at least one metal, and an anion transport material dispersed in the binder;

a second base layer comprising the at least one metal M and a second binder without the anion transport material, the second layer disposed between the carrier and the first layer; and an overlap zone including an interface between the first catalyst layer and the second base layer defined by characteristics of both the first catalyst layer and the second base layer and having a thickness of 1-20 μm;

wherein the binder content in the first layer is less than in the second layer;

wherein the first layer and the second layer each comprise respective hydrophobic pores and/or channels;

wherein a first surface of the first layer faces the carrier and the second layer, and a second surface of the first layer faces away from the carrier and the second layer;

wherein the second surface has hydrophilic properties;

wherein the at least one metal is selected from the group consisting of: Ag, Au, Cu, and PD;

wherein the anion transport material comprises an ion exchange resin or a zeolite with a cation blocker function and conducting OH ions and/or $HCO_3$ through the first layer; and wherein the anion transport material comprises no imidazolium-, pyridinium-, or β-hydrogen-containing groups.

2. The gas diffusion electrode as claimed in claim 1, wherein the anion transport material is disposed on a surface of the gas diffusion electrode.

3. The gas diffusion electrode as claimed in claim 1, wherein the anion transport material is stable at a pH of more than 7.

4. The gas diffusion electrode as claimed in claim 1, wherein the anion transport material includes quaternary alkylammonium groups.

5. The gas diffusion electrode as claimed in claim 1, wherein the anion transport material has been at least partly fluorinated.

6. The gas diffusion electrode as claimed in claim 1, wherein the anion transport material includes OH groups and/or $NH_2$ groups.

7. The gas diffusion electrode as claimed in claim 1,
wherein the second layer includes 3-30% by weight of the binder; and
wherein the first layer includes 0-10% by weight of the binder.

8. The gas diffusion electrode as claimed in claim 7, wherein a proportion by weight of the ion transport material in the second layer is greater than the proportion by weight of the binder.

* * * * *